(12) United States Patent
Take

(10) Patent No.: US 6,320,350 B1
(45) Date of Patent: Nov. 20, 2001

(54) MODULATION CONTROL TYPE OF AC MACHINE

(76) Inventor: Takashi Take, 20-13, Daita 5-Chome, Setagaya-Ku, Tokyo (JP)

( * ) Notice: Subject to any disclaimer, the term of this patent is extended or adjusted under 35 U.S.C. 154(b) by 0 days.

(21) Appl. No.: 09/289,343

(22) Filed: Apr. 9, 1999

Related U.S. Application Data

(63) Continuation-in-part of application No. 08/531,436, filed on Sep. 21, 1995.

(51) Int. Cl.$^7$ ........................................................ H02P 5/28
(52) U.S. Cl. ............................ 318/811; 318/717; 318/724; 318/587; 318/114; 318/148
(58) Field of Search ................................. 318/798–815, 318/700–726, 727–797, 587, 623, 114, 140–158

(56) References Cited

U.S. PATENT DOCUMENTS

| | | |
|---|---|---|
| 1,499,359 | 7/1924 | Fortescue . |
| 2,253,966 | 8/1941 | Baumann . |
| 4,058,755 | 11/1977 | Honbu et al. . |
| 4,295,084 * | 10/1981 | Nagase et al. ........................ 318/719 |
| 4,322,672 * | 3/1982 | Walker .................................. 318/812 |
| 4,547,719 * | 10/1985 | Sakamoto et al. ................... 318/811 |
| 4,595,851 | 6/1986 | Houben et al. ....................... 310/246 |
| 4,928,046 | 5/1990 | Karasawa ............................. 318/654 |
| 4,935,684 | 6/1990 | Watanabe . |
| 5,287,051 * | 2/1994 | Konrad et al. ....................... 318/803 |

FOREIGN PATENT DOCUMENTS

| | | |
|---|---|---|
| A-00110561 | 3/1988 | (EP) . |
| 647690 | 12/1950 | (GB) . |
| 715605 | 9/1954 | (GB) . |
| 2055515 | 4/1981 | (GB) . |

* cited by examiner

*Primary Examiner*—David S. Martin
(74) *Attorney, Agent, or Firm*—Townsend and Townsend and Crew LLP; Kenneth R. Allen

(57) ABSTRACT

A modulation control type of AC motor includes a modulator and a modulation motor. The modulation motor has the structure in which a DC field power source of a two-phase synchronous motor is replaced by a load and a DC main magnetic flux is replaced by an alternate main magnetic flux. There is no interference between the frequency of an AC power source and the frequency of a modulation signal. Therefore, the synchronous torque and the rotation speed can be controlled separately and independently. The controllable range is wide.

8 Claims, 17 Drawing Sheets

FIG. 12B  θ = 0 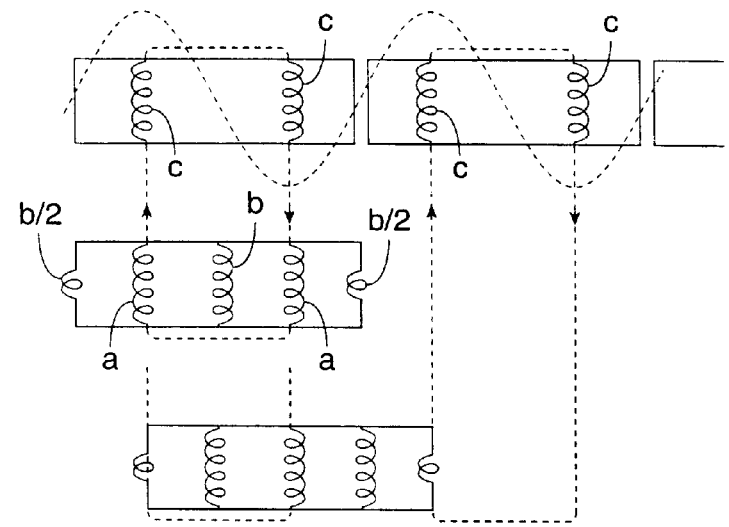
FIG. 12C  θ = π/2 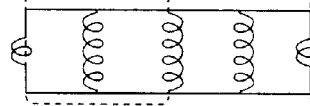
FIG. 12D  θ = 2π/2 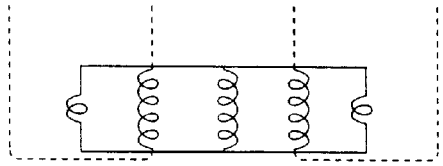
FIG. 12E  θ = 3π/2 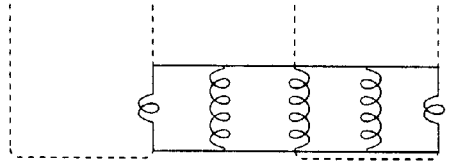
FIG. 12F  θ = 4π/2 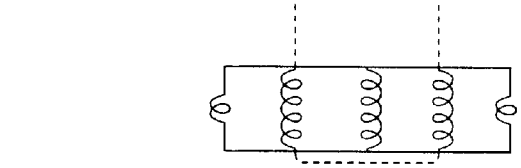

MODULATION CONTROL TYPE OF AC MACHINE

This application is a continuation-in-part of and claims the benefit of U.S. patent application Ser. No. 08/531,436, filed Sep. 21, 1995, the disclosure of which is incorporated by reference.

BACKGROUND OF THE INVENTION

1. Field of the Invention

The present invention relates to a modulation control type of AC machine, and more particularly, to a modulation control type of AC machine which can remove drawbacks of a conventional AC machine to improve the characteristics of industrial facilities and has many application fields.

2. Description of Related Art

Conventional AC machines can be classified into AC motors and AC generators and the structures of AC machines are different from each other depending upon the types. Generally, the AC motor is employed for driving and controlling various types of industrial facilities and the AC generator is used for generation of power, using a prime mover. However, the AC machines differ from each other in the characteristics and purposes depending upon the types. Therefore, the type of the AC machine is to be selected based on a usage purpose. For instance, there are a drawback of rotation speed control in a synchronous motor and a drawback of change of rotation speed due to the load of a rotor in an induction motor. The problems of the conventional various types of AC machines will be described below.

The conventional various types of AC machines such as a synchronous AC machine, an induction AC machine and a selsyn motor have different structures, operation principle and characteristics from each other and have the respective inherent problems. The modulation control type of AC machine according to an aspect of the present invention has an indirect relation to the conventional various types of AC machines. The basic principle of the modulation control type of AC machine according to an aspect of the present invention can be explained by using the relation. However, in order to make clear the difference between the present invention and the conventional AC machines, the problems of the conventional AC machines will be described below.

A synchronous motor uses a rotary magnetic field which is constituted by a DC main magnetic flux which is proportional to the frequency of an AC power source and rotates with a synchronous rotation speed. Therefore, DC electromagnetic force generated by field windings through which DC field current is flown acts as synchronous torque for rotating a rotor with a synchronous rotation speed. In this case, however, the rotor has a delay angle in relation to the DC main magnetic flux. The synchronous motor requires an AC power source and a DC power source and this is a drawback on the structure. The rotation speed and synchronous torque are controlled by changing the AC power source frequency and the DC field current, respectively. For purpose of increasing the rotation speed, if the AC power source frequency is increased, the magnetizing current, DC main magnetic flux and synchronous torque are decreased. Accordingly, the voltage of AC power source needs to be increased for the purpose. Further, if the AC power source frequency is decreased for purpose of decreasing the rotation speed, the magnetizing current is increased to cause magnetic saturation, as contrary to the above case. Accordingly, the AC power voltage needs to be decreased. As a result, the size of synchronous motor becomes larger and larger for response to the change of AC power source voltage, resulting in increased weight and reduced efficiency.

In the synchronous motor, alternate magnetomotive force is generated which is proportional to the product of the number of turns of the stator winding for each value of phase and load current. However, the synchronous motor has no secondary circuit for canceling the AC magnetomotive force. Therefore, there is a drawback in armature reaction which generates reactance to prevent the load current. The armature reaction is the causes of distortion influencing to the DC main magnetic flux generated by the magnetizing current and demagnetizing action. If the alternate magnetomotive forces of respective phases are synthesized, DC magnetomotive force can be obtained. Further, if the load torque of the rotor is greater than the synchronous torque, the synchronous motor causes the step-out from the synchronization to stop rotation, resulting in loss of the synchronous torque. If the DC field current is increased in order to prevent the step-out, the polarization by the DC excitation causes magnetic saturation. Therefore, the AC power source increases the exciting current so that the power factor is decreased and the temperature is increased.

A synchronous generator is necessary to be equilibrium between the AC power source voltage and the generated voltage, power is supplied through the generated voltage and its phase. Accordingly, in order to keep the synchronous rotation speed, a speed control unit with precise control capability is applied to a prime mover. Since the power is generated based on a lead angle of the rotor, a voltage difference is necessary between the AC power source and the synchronous generator. In the power generation, the load current and magnetizing current are supplied from the synchronous generator to the AC power source. If the direction of voltage difference is inverted, the synchronous generator acts as a synchronous motor. If the generated power is changed, the load current and armature reaction change the generated voltage and the phase. There is a drawback that circulating current flows between synchronous generators operated in parallel so that turbulence of generated power is readily caused due to the synchronizing function.

In the induction motor, since primary winding corresponds to stator winding of the synchronous motor, the same rotary magnetic field as in the synchronous motor is generated in the stator. The relation of the primary winding and the secondary winding is similar to the electromagnetic coupling in a transformer and a load is connected to the secondary winding. Since the load current is supplied from the AC power source, the induction motor has a simple structure, compared to that of the synchronous motor. Since the load current flowing through the primary winding in each of the phases is proportional to that flowing through the secondary winding of the corresponding phase, the alternate magnetomotive force representative of the product of the number of turns in the primary winding and the load current flowing in the primary winding and that of representative of the product of the number of turns of the primary or secondary winding and the load current are equal to each other and cancelled. Therefore, there is no armature reaction and any reactance preventing the load current is removed.

Exciting current flows in each phase of the primary winding. If the components of reactive current as the magnetizing current are synthesized over all the phases, an equivalent DC magnetizing current is obtained which generates a DC main magnetic flux. When secondary reactive currents having the same phase relation as the magnetizing currents are synthesized over all the phases, an equivalent DC current is obtained similarly which corresponds to a DC field current of a synchronous motor. Thus, in the induction motor, the rotor is rotated based on the synchronous torque which is generated with the same principle as in the synchronous motor. Further, it indicates that the secondary reactive current is necessary for the rotation. Since the secondary active current in each phase has a phase difference of $\pi/2$ in relation to the magnetic flux generated by the primary winding in the phase, an average of AC electromagnetic forces which is proportional to the product of the secondary active current and the number of turns of the secondary winding is zero. Therefore, the secondary active current has no relation to the synchronous torque.

In the induction motor, the rotation speed changes due to slip of the rotor so that the secondary voltage and the frequency decrease. Equivalent DC current reduces because of the reduction of secondary voltage and the rotation speed is decreased from the synchronous rotation speed because of the slip. Actually, since the rotation of the rotor itself is added to the rotation of a DC magnetic flux in which the slip frequency of the rotor is taken into account, the rotor rotates in the same direction as the rotation direction of the DC magnetic flux in synchronous with the DC main magnetic flux by the stator. This is representative of the rotation principle of the induction motor which is the same as that of the synchronous motor. However, the synchronous torque in the induction motor does not mean the synchronization with the rotor. Further, active load current in the secondary windings is proportional to a mechanical output.

There is a difference in the rotation speed between the equivalent DC current and the rotor. Since a rotary field which is rotated in proportional to the slip frequency is necessary for the rotor, polyphase winding is employed for the secondary winding so that the rotary field for the rotor rotates in proportional to the slip frequency. The synchronous torque generated in the induction motor is always equilibrium to the mechanical load torque of the rotor. When the load torque is increased, the slip increases so that the secondary voltage and secondary reactive current are increased. As a result, the synchronous torque is increased and, therefore, there is no stepping out. However, the rotation speed is decreased because of the increase of slip.

If the rotor of the induction motor is forced to be rotated by a prime mover, the direction of slip becomes inverted. As a result, the lead angle is generated in the rotor so that the induction motor acts as an induction generator. In this case, the lead angle corresponds to that of a synchronous generator and the same power generation can be achieved. The rotary field in the induction generator is generated using an AC power source. Accordingly, the AC power source cannot be disconnected. The generated power is controlled by changing the load of secondary winding. The torque of a prime mover changes the lead angle to change the generated power.

A selsyn motor is composed of a transmitter and receiver which have the same structure and are connected to each other in parallel. The rotor windings of the transmitter and receiver are connected to a common single-phase AC power source such that one set of AC main magnetic fluxes are generated by magnetizing currents, respectively. Generally, the stator windings are each composed of two- or three-phase winding and are connected between the transmitter and the receiver such that parallel circuits are formed in correspondence with each of phases.

It is assumed that the numbers of turns of two-phase stator windings a and b and a single-phase rotor winding c in the transmitter and receiver are equal to each other. Further, it is assumed that a single-phase AC power source outputs a constant voltage e of a sine wave with a constant frequency. In the transmitter and receiver, alternate main magnetic fluxes $\phi$ having the same sine wave form are generated by the c windings, respectively. In this case, if there is no voltage difference between the induced voltages by a and b, the rotors do not rotate. Therefore, the selsyn motor corresponds to two equivalent single-phase transformers. In this case, assuming that the induced voltages are $e_{a1}$ and $e_{b1}$ because the secondary windings correspond to a and b. In the equivalent single-phase transformers, $e_{a1}$ and $e_{b1}$ are equal to each other so that the direction does not change.

The transmitter has inherent characteristics. If the rotor of the transmitter is continuously rotated with a predetermined rotation speed by external force, a magnetic flux $\phi$ changes interlinkage angles with the secondary windings a and b because of the rotation of magnetic flux $\phi$ so that the induced voltages $e_a$ and $e_b$ are modulated in amplitude. Therefore, the amplitudes of induced voltages $e_a$ and $e_b$ change in proportional to the rotation speed. When the rotation speed is sufficiently small in relative to the frequency of AC power source, the amplitude can be represented by envelope lines of sine waves symmetric with respect to a center line as an outside profile line when a drum type body is cut along a center axis.

FIGS. 1A to 1C show the waveform of e for the waveforms of induced voltages $e_a$ and $e_b$. The maximum amplitudes are equal to each other. Voltages $e_{a1}$ and $e_{b1}$ are modulated in amplitude because of the rotation of rotor to change into the voltages $e_a$ and $e_b$, respectively. Thus, the AC power source voltage e functions as a single-phase carrier signal voltage. There is a phase difference between the voltages $e_a$ and $e_b$, which indicates that the voltages $e_a$ and $e_b$ are two-phase modulated in amplitude. Expressing two-phase modulating voltages as $e_{a2}$ and $e_{b2}$, the voltages $e_{a1}$ and $e_{b1}$ are modulated in amplitude by the modulating voltages $e_{a2}$ and $e_{b2}$, respectively. The voltages $e_a$ and $e_b$ correspond to the waveforms obtained by synthesizing $e_{a1}$ and $e_{b2}$, and $e_{b1}$ and $e_{b2}$, respectively. Magnetizing current produced from the single-phase carrier power source generates alternate main magnetic flux $\phi$ which has a predetermined constant amplitude and alternates in synchronous with the carrier frequency. The two-phase modulating voltages $e_{a2}$ and $e_{b2}$ contained in the voltages $e_a$ and $e_b$ function to alternately deliver the alternate main magnetic flux $\phi$ to the secondary windings a and b in accordance with the modulating frequency. However, there is no change in the magnetizing current and alternate main magnetic flux. Further, reactive power supplied from the power source passes through the transmitter to the receiver. As a result, the transmitter and receiver are synchronously rotated. The alternate main magnetic flux $\phi$ inverts the direction of interlinkage with the winding a and b for every half of each rotation of the rotor. Therefore, the polarities of induced voltages $e_a$ and $e_b$ are inverted for every half wave. The polarity and phase of the carrier voltage $e_{a1}$ and $e_{b1}$ are also inverted repeatedly at the same time as the inversion of polarity. FIGS. 1A to 1C show the change of voltages $e_a$ and $e_b$ in amplitude and phase inversion of voltage $e_{b2}$ and $e_{b2}$.

The transmitter can be regarded as a type of mechanical modulator which equips all the above conditions. It has been described that any modulator is necessary for a modulation control type new AC machine according to the present invention. This mechanical modulator can be employed for the purpose. In the selsyn motor, if the transmitter is rotated in relative to the receiver, non-equilibrium voltage is generated because of non-equilibration between the rotors in angle so that $e_a$ and $e_b$ are not cancelled in each phase. As a result, the wave height of non-equilibrium voltage changes in the drum type waveform manner so that reactive circulating current reversely proportional to leakage reactance flows between the two parallel circuits. If the reactive circulating currents are synthesized in a vector manner, the synthesized reactive circulating current and the alternate main magnetic flux generates synchronous torque for removing the non-equilibrium angle by electromagnetic force. This is the operation principle of the selsyn motor.

The non-equilibrium voltage changes based on the angle difference between the rotors of transmitter and receiver. Since the non-equilibrium voltage is small compared to the voltages $e_a$ and $e_b$, the change of synchronous torque is also small. The rotation speed is proportional to the modulation frequency but has no relation to the AC power source frequency. In the two parallel circuits, the products of the synthesized active circulating current and the voltages $e_a$ and $e_b$ represent the powers which act on the transmitter and receiver, respectively. However, they are cancelled because the directions of them are opposite to each other. Therefore, the common single-phase power supply does not operate to supply the power and active current. Actually, the selsyn motor has the inherent characteristic that any mechanical output cannot be increased because the power and active current is not supplied. Generally, the alternate main magnetic flux is obtained by synthesizing a positive phase rotary magnetic field and a reverse phase rotary magnetic field which have the same rotation speed and the same amplitude and rotates in directions opposite to each other. This is conventional technical common sense.

If one phase of two-phase primary windings of a two-phase induction motor is excited by a single-phase AC power source, this corresponds to a single-phase induction motor in which an alternate main magnetic flux is generated. However, in this case, the rotor does not rotate because there is no start torque. If the rotor is once rotated by external force, the rotor continuously rotates based on spontaneous torque. At this time, the external force may be removed. This is because a reactance difference between the positive phase reactance and the reverse phase reactance is generated because of the rotation so that the rotor is continuously rotated based on the difference between positive phase torque and reverse phase torque. The structure of receiver is similar to this and the spontaneous torque prevents the rotation operation of selsyn motor. If the spontaneous torque is increased to be greater than the synchronous torque, the receiver becomes unstable because of the spontaneous torque. The rotation speed of the selsyn motor is limited and the rotation speed cannot be increased. The single-phase rotor winding of the receiver corresponds to the DC field winding of the two-phase synchronous motor and they have the same structure. In the synchronous motor, however, when the power frequency changes, the rotation speed, magnetizing current, DC main magnetic flux and synchronous torque also change. On the other hand, there is no DC magnetic flux in the receiver, the rotation speed of the receiver is controlled by the transmitter. Thus, a predetermined alternate main magnetic flux generated by the predetermined AC power source voltage has no relation to the rotation speed. In this manner, since the selsyn motor has the peculiar characteristic and mechanical output cannot be increased.

Therefore, the selsyn motor differs basically from the synchronous motor in the characteristic and operation principle.

As described above, the existing AC machines have different characteristics and drawbacks depending upon the types and there is a strong demand for a new AC machine to overcome the above drawbacks.

SUMMARY OF THE INVENTION

The present invention is a new AC machine for control and power generating operation of the industrial equipments to improve the efficiencies. Since a modulator is employed between the new AC machine and AC power source, the AC machine is of a modulation control type. The operation principle of the modulation control type AC machine will be described later. The operation principle has no relation to any capacitor, and therefore, the modulation control type AC machine can be used widely in various fields. That is, the AC machine includes an AC motor and an AC generator for improving the productivity and generation efficiency of the industrial equipments. Therefore, the present invention can be implemented using software technology for the industrial equipments.

A new modulation control type of AC machine has a similar structure to that of the selsyn motor. However, a single-phase AC power source of the receiver can be replaced by an electric load. The transmitter corresponds to a mechanical modulator and the single-phase AC power source supplies power to the receiver. Therefore, the transmitter and the receiver need to have the same capacity and the supplied power is controlled by the load. In theory, two mechanical modulators having the same amplitude modulation characteristic as shown in FIGS. 1A to 1C constitute symmetric electric circuits and structure by connecting two two-phase stator windings in parallel with each other. The one single-phase rotor winding is connected to a single-phase AC power source to constitute a mechanical modulator for performing amplitude modulation. In the other mechanical modulator, a single-phase rotor winding is connected to an electrical load to generate torque for rotation to constitute a modulation AC machine. As a result, a modulation control type of AC machine can be constituted of the two mechanical modulators.

The mechanical modulator generates a single-phase alternate magnetic flux by the AC power source voltage and two-phase induced voltages are generated in the two-phase stator winding of the modulation AC machine by the alternate magnetic flux to excite the AC machine. Therefore, the magnetizing currents flowing in the respective phases of the two-phase stator winding are synthesized to generate the same single-phase alternate main magnetic flux as described above. As a result, an induced voltage is generated in a single-phase rotor winding of the modulation AC machine to flow a load current through the load. In a case where there is no angle difference between the mechanical modulator and the modulation AC machine, the state is same as that of the above-mentioned selsyn motor so that any torque is not generated. As a result, the modulation AC machine does not rotate. The two-phase stator winding of the modulation AC machine is excited by the synthesized magnetizing current and the single-phase rotor winding is excited by a component of a reactive load current having the same phase relation. As a result, the stator and the rotor function as a pair of AC electro-magnets. The electromagnet of the stator and the electro-magnet of the rotor generate AC electro-magnetic forces having the same phase in a direction of alternate main magnetic flux and in a direction of winding axis of the single-phase rotor winding, respectively. If there is an angle difference between the directions of AC electromagnetic forces of the pair, the rotor is attracted in a direction of the stator by the attractive force between the electro-magnets to keep an equilibrium state. For instance, if the rotor is displaced by external force in either direction, recovery force acts. It is verified through an experiment that the recovery force is synchronous torque to maintain the equilibrium state. The reactive load current component supplied to the two-phase stator winding does not change the alternate main magnetic flux generated by the synthesized magnetizing current. Since the rotor has the same structure as that of a single-phase induction voltage regulator or a rotary type of AC electromagnet, the rotor has the same equilibrating function as those of them. The spontaneous torque verifies the equilibrating function of the pair of AC electromagnetic forces.

If the rotor of the mechanical modulator is continuously rotated by external force, the rotor of the modulation AC machine is rotated in synchronous with the rotation of the rotor of the mechanical modulator because of the equilibrating function. That is, a new type of AC motor without having slip can be obtained. This represents the characteristics of the modulation control type of AC machine in which the synchronous torque can be arbitrarily increased by controlling the electric load. Therefore, in the modulation control type of AC machine, all the drawbacks described already on the selsyn motor are removed. The load current is supplied from the AC power source and corresponds to the secondary current of the induction motor described already. Accordingly, armature reaction is removed. In this manner, since reactance and thereby voltage drop are not generated to prevent the load current, the efficiency can be increased. The two-phase stator windings have spatial angle difference of approximately π/2 between them and no electromagnetic coupling. The two-phase stator winding corresponds to the two-phase exciting winding of a two-phase synchronous motor. The single-phase rotor winding corresponds to a DC exciting winding thereof but both are quite different from each other in the exciting voltage. That is, a new AC motor is constituted to combine the features and structures of the selsyn motor, induction motor and synchronous motor.

Assume to refer a new AC motor in which the mechanical modulator is rotated to perform amplitude modulation, as "a single-phase modulation motor". The difference between the single-phase modulation motor and a conventional two-phase synchronous motor will be described below. Further, assume to a magnetic field generated when the alternate main magnetic flux is rotated by the two-phase exciting voltage, as "an alternate rotary magnetic field." One difference between the alternate rotary magnetic field and the rotary magnetic field generated when a DC main magnetic flux is rotated in the synchronous motor will be described below. Note that the rotary magnetic field of the DC main magnetic flux has the relative relation to the alternate rotary magnetic field of alternate main magnetic flux so that the former can be replaced by the latter.

The alternate main magnetic flux having a predetermined amplitude alternates with the power source frequency and at the same time rotates in proportional to a modulation signal frequency. The power source frequency and the modulation signal frequency are separated from each other and there is no interference in the control them. When the power source frequency changes, the rotation speed and the DC main magnetic flux are both changed in the rotary magnetic field. Therefore, there is interference between the synchronous torque generated by the DC main magnetic flux and the rotation speed. This is a basic drawback in the control. If the rotor of the modulation motor is forcedly rotated by a prime mover in the same direction and the same speed, the power generating function is achieved. The characteristic is the same as that of a synchronous generator. Assume to refer to such a modulation motor as "a single-phase modulation generator." One difference between the modulation generator and the synchronous generator will be described below.

The modulation motor and the modulation generator constitute the modulation control type of AC machine which differs from conventional AC machines in the structure and operation principles. The difference is dependent upon the alternate rotary magnetic field generated by the mechanical modulator and the single-phase alternate main magnetic flux is generated to alternate in accordance with the frequency of the single-phase power source and to have a predetermined amplitude in the modulation control type of AC machine. At the same time, by controlling the modulation frequency in the mechanical modulator independent of the power source frequency, the synchronous torque generated by the alternate main magnetic flux and the rotation speed in proportional to the modulation frequency can be controlled independently from each other without any interference.

BRIEF DESCRIPTION OF THE DRAWINGS

FIGS. 12A to 12F are diagrams showing a relation between movement of an electric car and windings when a modified modulation motor is applied to the electric car as a linear motor;

DESCRIPTION OF THE PREFERRED EMBODIMENTS

The modulation control type of modulation AC machine according to an aspect of the present invention will be described below in detail with reference to the accompanying drawings. Note that although an angle is to be represented as $\theta=\omega t$ (t is time), because a frequency is proportional to $\theta$, $\theta$ is used as the angle and the frequency as it is, for simplification in the description and equations.

Figure 2:
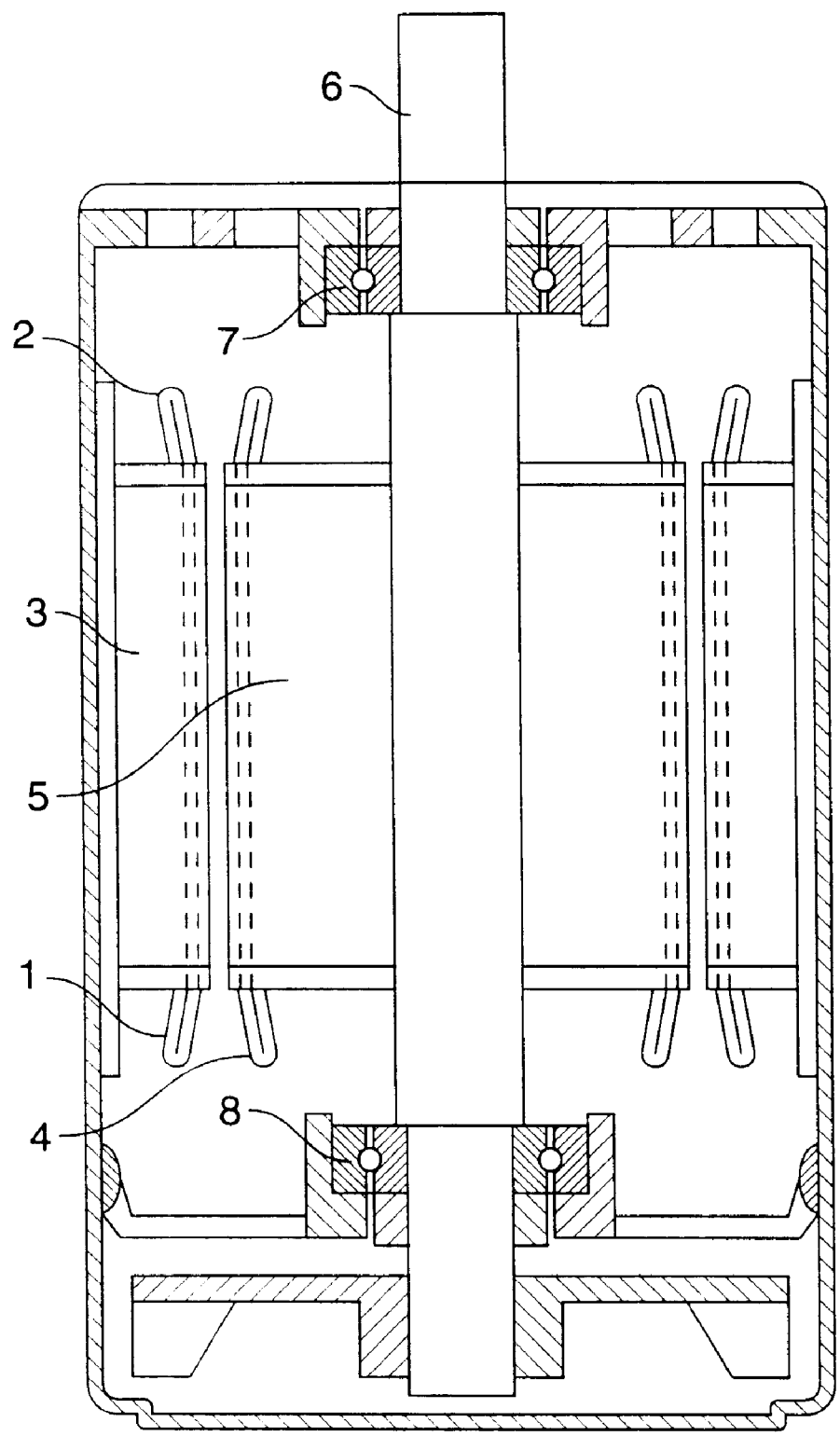
FIG. 2 is a diagram of an example of structure of a modulation motor according to an embodiment of the present invention.

FIG. 2 is an example of the structure of a single-phase modulation motor according to an embodiment of the present invention.

For instance, in a two-phase synchronous motor, a two-phase exciting winding having the angle difference of approximately $\pi/2$ between the phases is excited by two-phase AC voltage having the angle difference of approximately $\pi/2$ between the phases. When magnetizing forces of the respective phases are represented by $H_m \sin\theta_0$ and $H_m \sin(\theta_0-\pi/2)$, the instantaneous values of magnetizing forces do not change and $H_m$ has a constant value proportional to the amplitude. The magnetizing force synthesized from them is $$[(H_m\sin\theta_0)^2+\{H_m\sin(\theta_0-\pi/2)\}^2]^{1/2} = H_m$$

Since the synthesized magnetizing force $H_m$ remains approximately constant, it generates DC main magnetic flux at the temporal time. Since the two-phase AC voltage alternately excites the respective phases of the exciting winding, the direction of the DC main magnetic flux is changed to generate a rotary magnetic field. On the other hand, in the single-phase modulation motor, the DC main magnetic flux of the conventional rotary field is replaced by a single-phase alternate main magnetic flux of the alternate rotary field generated by an AC power source and an alternate rotary magnetic field can be obtained from the alternate main magnetic flux. The rotation speed of alternate rotary magnetic field has no relation to the frequency of the power source and is controlled only by the rotation of a mechanical modulator.

The single-phase rotor winding and the electric load of the rotor winding in the modulation motor having the similar structure as that of a two-phase synchronous motor correspond to a DC field winding and DC power source of the synchronous motor, respectively. Assuming to refer the single-phase rotor winding as "an AC filed winding" using the relation between the modulation motor and the synchronous motor, the difference in structure between the modulation motor and the synchronous motor will be described below.

Figure 3:
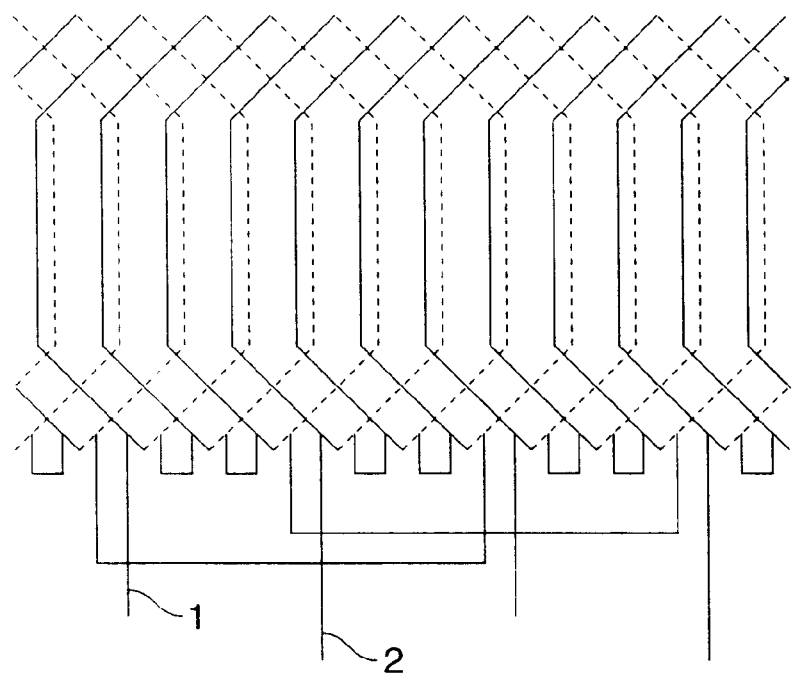
FIG. 3 is a winding diagram of an example of a stator winding in the modulation motor shown in FIG. 2.
Figure 4:
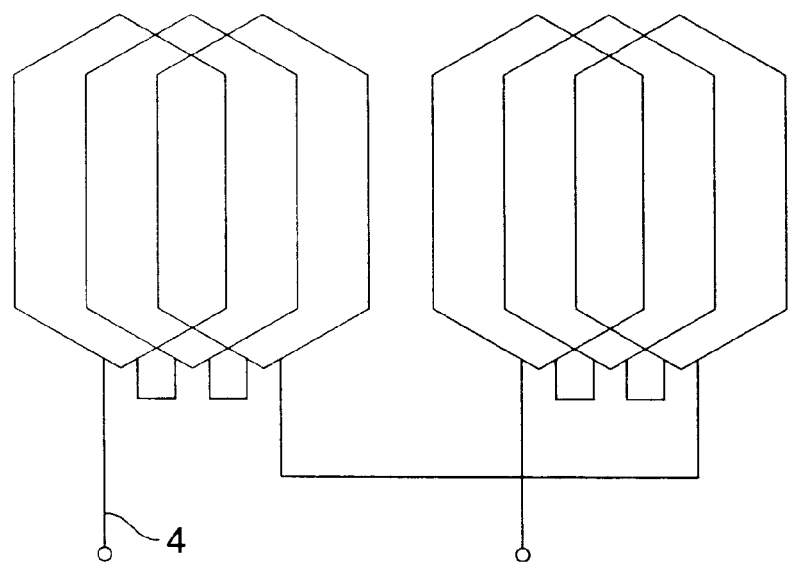
FIG. 4 is a winding diagram of an example of a rotor winding in the modulation motor shown in FIG. 2.
Figure 5:
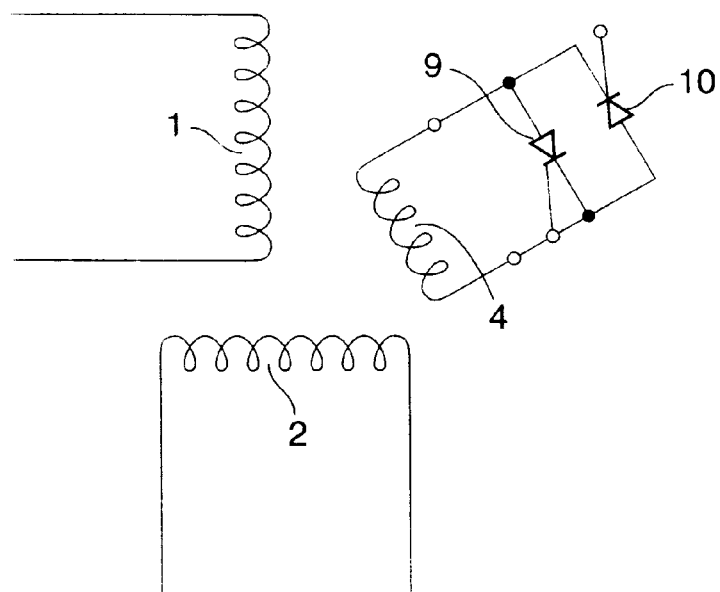
FIG. 5 is a diagram showing arrangement of windings in the modulation motor shown in FIG. 2.

Stator windings 1 and 2 are accommodated in the same slot of a stator iron core 3 and a field winding 4 is accommodated in a slot of a rotor iron core 5. The cylindrical rotor is fixed to a rotation axis 6 to have a predetermined narrow gap between the stator and the rotor and is supported by bearings 7 and 8 to rotate freely. In order to reduce eddy current generated due to an alternate main magnetic flux, the iron cores 3 and 5 are desirably formed of a laminate type of magnetic thin plate or dust magnetic material. FIG. 3 is a winding diagram of an example of stator winding 1 or 2 and FIG. 4 is a winding diagram of an example of exciting winding 4. FIG. 5 is a diagram showing the arrangement of windings in an electric circuit. For instance, the load of the field winding 4 is composed of two thyristors 9 and 10 which are connected having opposite directions to each other.

In a two-pole type of modulation motor, two similar distributed windings are located at symmetric positions of the gap with respect to the rotation axis and they are connected in parallel or in series. Accordingly, this structure corresponds to the structure in which the two-phase secondary winding of a two-pole type of two-phase induction motor is replaced by one field winding 4. In this manner, the modulation motor is a new AC motor which has both the structure of the synchronous motor and the structure of an induction motor. If the three-phase secondary winding of a two-pole type of three-phase induction motor is replaced with one field winding 4, it corresponds to the receiver of a three-phase selsyn motor and is a single-phase modulation motor using a three-phase stator winding. Therefore, the mechanical modulator corresponds to the transmitter of the three-phase selsyn motor.

The three-phase modulation motor has the structure which is composed of three sets of same single-phase modulation motors as shown in FIG. 2 and their rotation axes are connected commonly to each other. Each of the phases of the three-phase power source is used as a single-phase power source for each of the statuaries. Alternatively, a pair of iron cores is equally divided into three sections on the circumference thereof such that three sets of windings are accommodated in the divided sections equally apart from each other, resulting in a three-phase modulation motor having a unitarily integrated structure. In this case, the rotation speed and the distance between the windings are reduced to ⅓ but an electrical angle of $2\pi/3$ is not changed. Therefore, three alternate main magnetic fluxes are rotated keeping a predetermined angle difference. In the three-phase modulation motor, the synthesized synchronous torque generated by three-phase load current flowing through the three field windings is increased three times. Since there is no slip, the rotary field is not necessary for the rotor. However, the three sets of synchronous torque are generated by three sets of reactive load currents of the respective phases and the corresponding alternate main magnetic fluxes and are synthesized into synthesis synchronous torque. The three-phase load current is supplied from the three-phase AC power source and there is the same electromagnetic coupling and that of the three-phase induction motor with no slip or a three-phase transformer. Therefore, the synthesis synchronous torque corresponds to the start torque of the three-phase induction motor in that the magnitude of synthesized synchronous torque is dependent upon the delay angle. The load of the induction motor for limiting excess start current corresponds to the three-phase load of the modulation motor. By changing the three-phase load, the synthesis synchronous torque can be controlled in the modulation motor. The product of the synthesis synchronous torque and the rotation speed is output which is supplied as three-phase power from the three-phase AC power source. The same relation as described above is satisfied between the single-phase modulation motor and a two-phase induction motor.

Induction motors are mass-produced and used widely. Therefore, there are enormous technical experiences and design documents. These experiences and documents can be used for the design of the modulation motor because there is the relation described above between the modulation motor and the induction motor. The relation indicates that the operation principle of the modulation motor is reasonable and indirectly constructs the technical base of the modulation motor. The field windings may be designed to reduce the number of windings. For instance, the field windings having the less number of turns may be adhered or printed to the surface of rotor. Alternatively, a metal ring may be mounted to the rotor. In this case, there can be obtained the effect that the gap is decreased so that the leakage flux and exciting current can be decreased.

If the rotor and stator are cut at a position of gap and they are extended in a plane manner, a linear motor can be obtained. Further, if the stator and the rotor are fixed and only the field winding is rotated, the so-called coreless motor can be obtained.

Figure 1A:
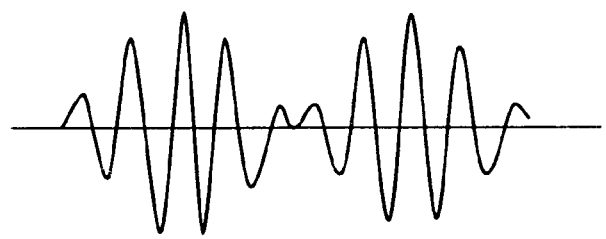
FIGS. 1A to 1C are amplitude-modulated voltage waveforms and the waveform of voltage inputted to a mechanical modulator to represent phase relation between the voltage waveforms.
Figure 1B:
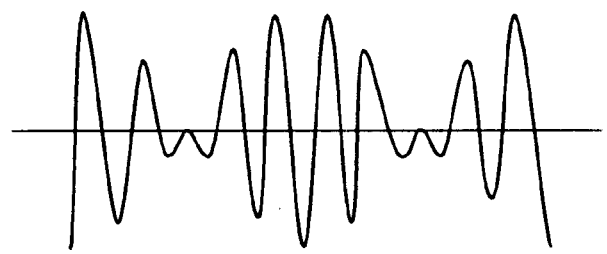
Figure 1C:
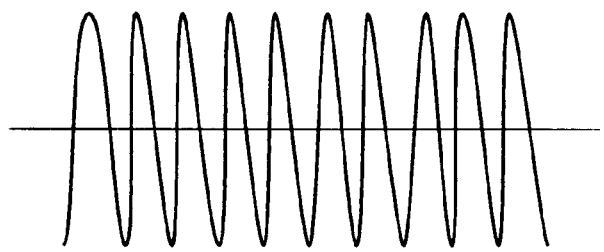

A static type of modulator can be obtained if the waveforms shown in FIGS. 1A to 1C are generated through controlling and amplifying operations using transformers, an electric circuit, and semiconductor devices. In this case, the AC power source voltage is modulated in amplitude and amplified by the semiconductor devices to cause the transformer to generate the same induced voltage at the two-phase secondary winding which induced voltage is the same as in the mechanical modulator. For instance, this corresponds to a servo amplifier in a brushless motor. The static type modulator is referred to as "a modulation amplifier" hereinafter. The modulation amplifier satisfies the necessary conditions in conjunction with FIGS. 1A to 1C and has some of the same functions as the mechanical modulator.

SOME OPERATION PRINCIPLES OF THE INVENTION

The characteristics of the modulation motor are determined based on the synchronous torque and the rotation speed and have close relation to the operation principle and operation of the present invention.

Assuming that the frequency of the single-phase power is $\theta$ and the modulation frequency is $\theta$, the voltages shown in FIGS. 1A to 1C have the following relations. Note that $2\pi$ is omitted from the angle representation of two-phase winding 1 and 2 for simplification.

$e_a = e \sin\theta = (2)^{1/2} E \cdot \sin\theta_0 \cdot \sin\theta$ $e_b = e \cdot \cos\theta = (2)^{1/2} E \cdot \sin\theta_0 \cdot \sin\theta$ $e = (2)^{1/2} E \cdot \sin\theta_0$ where E is an effective voltage value of the single-phase power and is basically constant. Windings 1 and 2 shown in FIG. 5 have not any interference operation to each other because although the voltages $e_a$ and $e_b$ generate alternate magnetic fluxes $\phi_a$ and $\phi_b$, there is an angle difference of $\pi/2$ between the directions of the windings 1 and 2. Further, if the alternate magnetic fluxes $\phi_a$ and $\phi_b$ are synthesized in a vector manner, an alternate main magnetic flux $\phi$ can be obtained. The synthesized voltage from the exciting voltages $e_a$ and $e_b$ is $\{(e \cdot \sin\theta)^2 + (e \cdot \cos\theta)^2\}^{1/2} = e$ and the magnitude of the synthesized voltage has no relation to the phase inversion of the exciting voltages $e_a$ and $e_b$ described in conjunction with FIGS. 1A to 1C. Therefore, the directions of the alternate magnetic fluxes $\phi_a$ and $\phi_b$ and alternate main magnetic flux $\phi$ and the directions of the voltages $e_a$, $e_b$ and $e$ can be represented on the same vector diagram shown in FIG. 6. Note that FIG. 6 only represents the directions of space vectors. Actually, the voltage $e_a$ or $e_b$ is in-phase or inverse phase with respect to the voltage e and the phase relation changes dependent upon modulation frequency $\theta$.

Generally, $(-1)^{1/2} = j$ is given, there are the following relations:

$\cos\theta = (\frac{1}{2})(\epsilon^{j\theta} + \epsilon^{-j\theta})$ $\sin\theta = (\frac{1}{2})\{\epsilon^{j(\theta - \pi/2)} + \epsilon^{-j(\theta - \pi/2)}\}$ The alternate main magnetic flux can be expressed by $(\frac{1}{2})[(\epsilon^{j\theta} + \epsilon^{-j\theta}) + \epsilon^{j(\pi/2)}\{\epsilon^{j\theta - \pi/2} + \epsilon^{-j(\theta - \pi/2)}\}]\phi = \phi\epsilon^{j\theta}$   (2)

from the angle difference of $\pi/2$ between the windings 1 and 2. Here, $\epsilon^{j\theta}$ in the above equation (2) is a unit vector rotating with $\theta$ in a direction indicated by an arrow in FIG. 6. Also, $\phi$ is the alternate main magnetic flux alternating with an angle of $\theta^0$ having a predetermined amplitude. Note that any rotary field rotating with an angle of $\theta_0$ is not contained in the equation (2). Therefore, the equation (2) represents the characteristic of AC rotary field.

Since there is a phase difference between the respective phases of AC power source voltage in a synchronous motor, a DC main magnetic flux rotates. On the other hand, the modulation motor of the present invention has no relation to the frequency of the power source voltage and the alternate main magnetic flux is rotated in accordance with the phase difference between the respective phases of a modulation signal voltage. Therefore, the synchronous motor and modulation motor have the same rotation mechanism in principle but is different in rotation speed from each other. In the modulation motor, the power as the product of the rotation speed and the synchronous torque is generated by the single-phase carrier voltage supplied from the single-phase power source. Load currents of the exciting winding and single-phase rotor winding which are proportional to each other generates alternate magnetomotive forces, respectively. However, the magnetomotive forces are cancelled from each other so that armature reaction is removed. Accordingly, there is no drawback of polarization and magnetic saturation which are drawbacks in the synchronous motor and the synchronous torque can be arbitrarily increased in the modulation motor. The modulated signal is distributed to the respective phases of the stator winding in the form of power of the power source. The power is alternately supplied to each of the phases of the stator winding and the rotation speed is controlled by repeating the operation. However, there is no function for changing the alternate main magnetic flux and generating any power. Therefore, the single-phase carrier power source as the single-phase power source supplies all the power required. In this manner, in the present invention, the carrier frequency and the modulation signal frequency are separated from each other, and they are controlled independently without any interference operation. The alternate main magnetic flux generated from AC power source with a predetermined amplitude is rotated keeping the predetermined amplitude. Although the synchronous torque and output are controlled by controlling the load of the field winding, there is no drawback that the alternate main magnetic flux is changed. This is the basic principle of the present invention and the character peculiar to the modulation motor.

When the angle difference between the field winding 4 and the alternate main magnetic flux $\phi$ is represented by $\beta$, the induced voltage in the field winding 4 is proportional to $\cos\beta$. When a power factor angle of the load connected to the field winding 4 and the load current of the field winding 4 are represented by $\alpha$ and $i_2$, respectively, and when the effective value at the maximum of current $i_2$ is represented by $I_2$, the current $i_2$ is given by the following equation.

$$i_2 = (2)^{1/2} I_2 \sin(\theta_0 - \alpha) \cos\beta \quad (3)$$

where $\beta$ is a delay angle generated in the rotor because of suppression operation that the load torque prevents the rotation of rotor. When a cross sectional area of a magnetic circuit and a maximum magnetic flux density are represented by A and B, respectively, the product AB is proportional to a maximum value $(2)^{1/2}E$ of the voltage e.

Figure 7:
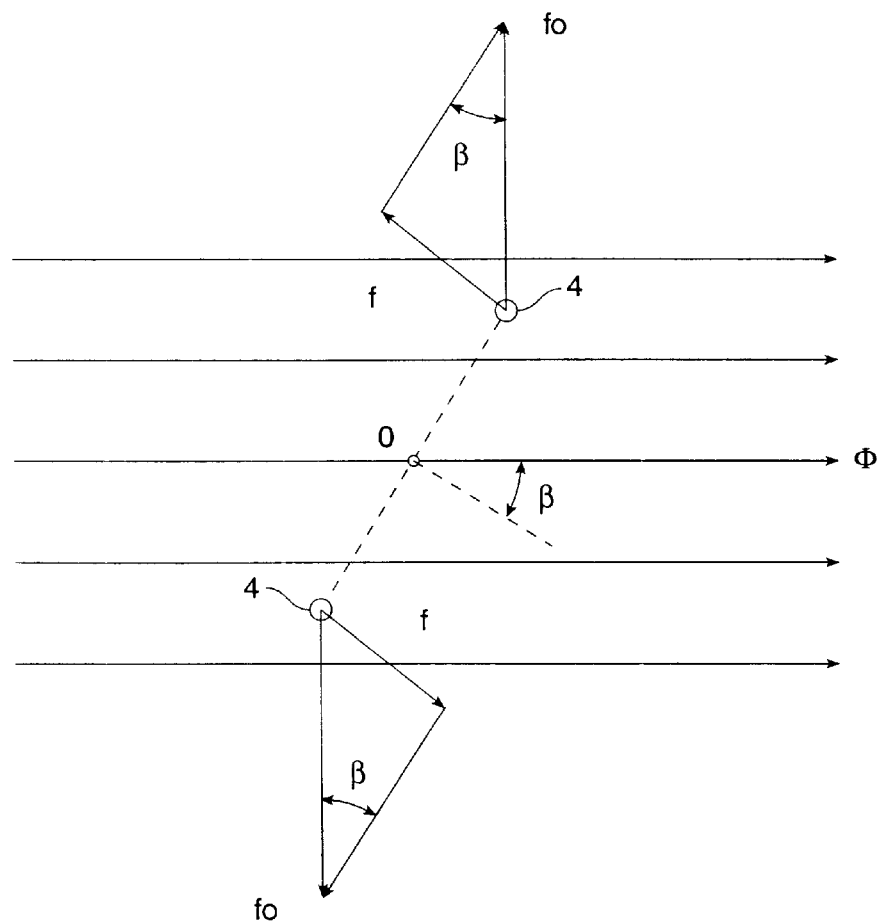
FIG. 7 is a vector diagram of AC electromagnetic forces generated by the alternate main magnetic flux and load current in the rotor winding in the modulation motor shown in FIG. 2.

FIG. 7 is a diagram showing the arrangement of a conductor element of the field winding 4 having a length of S and the alternative main magnetic flux $\phi$. If the number of turns of the field winding 4 is $N_2$, the number of turns in the conductor element is $2N_2$. Therefore, AC electromagnetic force $f_0$ generated at the field winding 4 is perpendicular to the alternate main magnetic flux $\phi$ from the Fleming's left-hand rule, $f_0\sin\beta$ pair (=f) is torque operating with respect to a rotation axis 0 of the rotor. Since $f_0\sin\beta$ pair operates with respect to the rotation axis 0 in opposite directions, it is cancelled.

The Fleming's left-hand rule is satisfied in a special case. The conductor element is composed of $2N_2$ conductive wires each having a length of S and there is a spatial angle difference of $\pi/2$ between the current $I_2$ and the alternate main magnetic flux $\phi$. Therefore, $f_0$ is proportional to $2N_2 \cdot S \cdot i_2 \cdot \phi$. However, there is a delay angle $\beta$, the magnetic flux interlinking with the field winding 4 in FIG. 7 is reduced to $\phi\cos\beta$. Also, the force $f_0$ is represented as $2N_2 \cdot S \cdot i_2 \cdot \phi \cos\beta$.

If the air gap radius of the iron core is represented by R, the length S is approximately equal to 2R. The force $f(=f_0\sin\beta)$ in FIG. 7 generates torque and $$f = 2N_2 \cdot 2R \cdot i_2 \cdot \phi \cdot \cos\beta \sin\beta$$
$$= 2N_2 \cdot R \cdot i_2 \cdot \phi \cdot \sin 2\beta$$

The instantaneous value of the magnetic flux density is $B\cos\theta_0$, because there is a phase difference of $\pi/2$ for $\sin\theta_0$ of the equation (1). Therefore, if the equation (3) is substituted into the above equation, the instantaneous value 2Rf of the torque $\tau$ can be obtained as follows.

$$\tau = k_1 \cdot (4R^2 N_2) \cdot A \cdot B \cdot \cos\theta_0 \{(2)^{\frac{1}{2}} I_2 \cdot \sin(\theta_0 - \alpha) \cdot \cos\beta\} \sin 2\beta \quad (4)$$
$$= 2k_2 \cdot I_2 \cdot B \cdot \cos\theta_0 \cdot \sin(\theta_0 - \alpha) \cdot \sin 2\beta \cdot \cos\beta$$
$$= k_2 \cdot I_2 \cdot B \{\sin(2\theta_0 - \alpha) - \sin\alpha\} \sin 2\beta \cdot \cos\beta$$

$$T = -k_2 \cdot B (I_2 \cdot \sin 2\alpha) \sin 2\beta \cdot \cos\beta \quad (5)$$

where T represents average torque in a direction and the torque $\tau$ of the equation (4) can be obtained by synthesizing the average torque T and vibration torque. The vibration torque increases the frequency of vibration by the frequency of $2\theta_0$. However, since the rotor has inertial energy, the vibration torque is almost removed. In the equation (4), R, $N_2$, 5, A are determined based on the structure of the modulation motor, and $k_1$, and $k_2$ are proportional constants.

When the carrier signal frequency is constant, the magnetic flux B is also constant. Thus, the torque T is proportional to reactive load current $I_2 \cdot \sin\alpha$ and $\sin 2\beta \cdot \cos\beta$. However, since $\theta$ is not contained in the equation (5), the torque T has no relation to the rotation speed. The characteristic of synchronous torque is given by the equation (5). When $\alpha>0$ and $B=0$ there is no synchronous torque and when $\beta$ is increased, the synchronous torque is also increased. When the delay angle $\beta$ is increased in the equation (3), a degree of reduction of induced voltage at the field winding 4 and thereby reduction of synchronous torque is relatively small. This is because the delay angle $\beta$ generated based on the same principle as in a synchronous motor and the change of delay angle $\beta$ are sufficiently small. Therefore, the synchronous torque of the modulation motor has substantially the same torque characteristic as that of the synchronous motor.

If a prime mover forces the rotor to rotate in synchronous with the modulation motor, a modulation generator is obtained which has the same characteristics. The prime mover generates a lead angle through the suppression operation preventing the rotation of the modulation generator by the rotor without changing the rotation speed of modulation generator. For instance, if the synchronous torque of the modulation generator reduces rapidly, the inertial energy of the rotor functions as a prime mover and acts temporarily as the generation of power. The generated power supplied to AC power source is proportional to active current. The active load current is generated in the field winding through the same operation that the reactive load current is generated in the field winding. The active load current and reactive load current are both present in the field winding and they are synthesized into actual load current in the field winding. Therefore, current supplied from the AC power source is proportional to the load current in the field winding. If the exciting current from the AC power source is excluded, the power factor of the power source is determined based on the load of the field winding and is equal to the power factor of the load current.

The load current and magnetizing current of the respective phases 1 and 2 of the stator winding are modulated in amplitude by the mechanical modulator or modulation amplifier so that the alternate main magnetic flux having a constant amplitude. The alternate main magnetic flux induces voltage in the rotor winding 4 so that load current and synchronous torque of the motor are generated. Therefore, the amplitude of the induced voltage is not modulated because of the constant amplitude of alternate main magnetic flux. The rotor and the alternate main magnetic flux are rotated synchronously.

The structure of the mechanical modulator and modulation motor can be replaced by an equivalent single-phase transformer because there is no slip. The load current is proportional to the current of the single-phase power source and the both currents have the same frequency as the power source frequency. Since the rotor is rotated based on the alternate rotary field, the synchronous torque functions to convert the power from the equivalent single-phase transformer into mechanical output. The load current of the field winding 4 is proportional to the load current obtained by synthesizing the load currents flowing through the respective phases 1 and 2 of the exciting winding in a vector manner. The load currents are cancelled from each other. Therefore, there is no armature reaction in the modulation motor and modulation generator. There is armature reaction in a synchronous motor and synchronous generator. As a result, reactance is generated such that voltage drop due to the load current reduces the efficiency. On the other hand, since there is no armature reaction in the modulation motor and modulation generator, any reactance is not generated to prevent the load current. Therefore, the synchronous torque can be increased by controlling the load. In this manner, the mechanical output and generation power can be readily increased.

In the three-phase modulation motor, since there is the phase difference of $2\pi/3$ between the sets of vibration torque expressed by the equation (4) because the three-phase power source is used, three sets of vibration torque are cancelled from each other and removed. Since the power source voltage is constant, the alternate main magnetic flux $\phi$ is inversely proportional to the product of the number of turns of each phase 1 or 2 of the exciting winding and the frequency of power source voltage. This is the same relation in the transformer. The rotation speed is proportional to the modulation signal frequency but has no relation to the frequency of power source. Accordingly, if the frequency of power source is increased without changing the power source voltage and the alternate main magnetic flux $\phi$, it is necessary to reduce the number of turns of each phase of the exciting winding in the modulation motor. As a result, the modulation motor becomes small, resulting in reduction of the weight. However, since there is no operation to change the rotation speed in principle, there is no change in the synchronous torque and mechanical output with the same load current. As a result, the inertial energy is decreased and the responsibility of rotation speed control can be improved. In this case, since the rotation speed is increased in the conventional synchronous motor and induction motor, it is harmful to the speed control. Although it is possible to remove the increment of rotation speed using a reduction unit, the reduction unit becomes complicated for increasing the reduction ratio, resulting in increasing the weight of reduction unit.

It was already described that the mechanical modulator has the same structure as that of the modulation motor. In this case, the alternate main magnetic flux is rotated mechanically by external force. In FIG. 7, if the alternate main magnetic flux $\phi$ and the field winding 4 are replaced by the alternate main magnetic flux of the mechanical modulator and the stator winding a, respectively, the reactive current of the stator winding a corresponds to that of the field winding 4. The same relation is established in the stator winding b. In FIG. 7, $\beta$ represents an angle difference between the alternate main magnetic flux $\phi$ and the field winding 4 and in the modulation motor the field winding 4 is rotated in synchronous with the alternate main magnetic flux $\phi$ together with the rotor. The angle difference $\beta$ does not substantially change depending upon the rotation of the field winding 4.

In the mechanical modulator, the angle differences between the alternate main magnetic flux $\phi$ and the stator windings a or b changes in proportional to the rotation of the rotor. The rotation angle of the rotor corresponds to $\beta$. Two sets of torque are generated from the reactive currents flowing in the stator windings a and b based on the equation (5) and can be expressed by two sine waves which change in proportional to $\sin 2\beta \cos \beta$. However, since the angle difference of $\beta(=\pi/2)$ between the stator windings a and b, $2\beta=\pi$ is established. Therefore, two sine waves are, opposite in phase to each other because of the phase difference of $\pi$, so that they are cancelled. If the maximum values are coincident with each other, average torque generated in the stator windings a and b of the mechanical modulator are synthesized to 0. This indicates that there is no reactive torque as reactive force against the external force acting to the rotor of the mechanical modulator. Since any rotor is not present in the modulation amplifier replaceable by the mechanical modulator, there does not exist the reactive torque as the reactive force.

In FIG. 2, considering the distributed windings 1, 2 and 4, the structure and arrangement are similar to the squirrel case cylinder. The winding axes of 1 and 2 are perpendicular to each other. Further, the directions of the windings 1 and 2 are perpendicular to the rotation axis of the rotor. It was already described that the exciting voltages $e_a$ and $e_b$ excite the windings 1 and 2 to generate the alternate magnetic fluxes and the alternate main magnetic flux $\phi$ having a predetermined amplitude can be obtained by synthesizing the alternate magnetic fluxes. Expressing this in FIG. 6, the alternate main magnetic flux $\phi$ rotates on a circumference taking 0 as a center.

Figure 6:
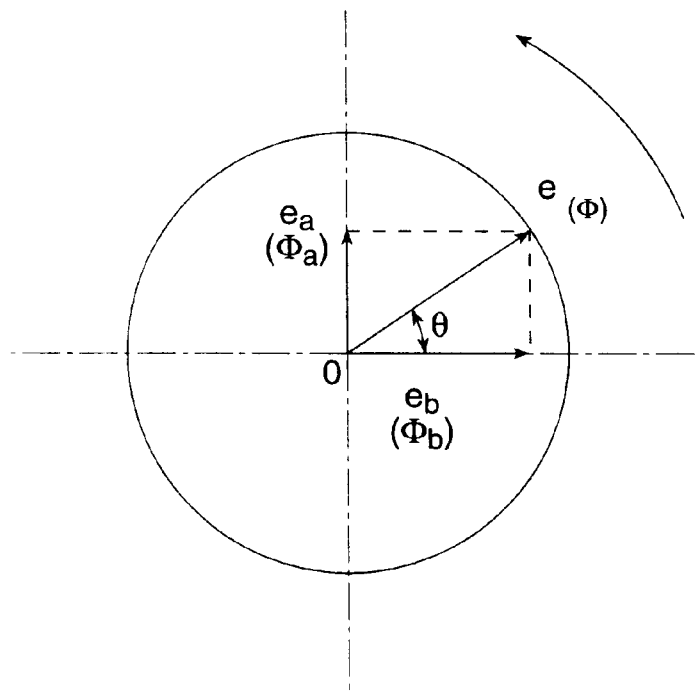
FIG. 6 is a diagram of a spatial vector showing a relation of the voltage and magnetic flux of the exciting winding a and b, wherein a spatial vector is not related to these phase angles, but combined vectors e and φ are related to power source voltage and alternate magnetic flux and an alternate rotary field is obtained when alternate main magnetic flux is rotated.

In the single-phase modulation motor having a three-phase stator winding, if the whole gap circumference is equally divided into three portions and three sets of windings 1, 2 and 4 are accommodated into the three portions, the distance between two sets of corresponding windings is reduced to ⅓ compared to that shown in FIG. 2. Also, the three sets of alternate main magnetic flux $\phi$ are reduced to $2\pi/3$ in space angle, i.e., ⅓, but the electric angle of $2\pi/3$ does not change. Also, the three sets of alternate main magnetic flux $\phi$ have the electric angle of $2\pi/3$ as a predetermined angle difference and do no interfere with each other. If one set of alternate main magnetic flux $\phi$ located on the position corresponding to $\theta=0$ in FIG. 6 is rotated by ⅓ of one rotation together with the rotor, the next set of alternate main magnetic flux $\phi$ comes to the position corresponding to $\theta=0$. Further, if the alternate main magnetic flux $\phi$ and the rotor are rotated by one rotation, this means that the above operation is repeated three times, which corresponds to three rotation of the rotor shown in FIG. 2. Therefore, it is indicated that the rotation speed is equivalently reduced to ⅓ in this single-phase modulation motor, compared to the rotor shown in FIG. 2. However, since the synchronous torque is increased three times, the mechanical output does not change.

In the two- or three-phase induction motor, if the secondary windings are shorted, a squirrel case induction motor can be obtained. However, since slip is decreased and the increase of the number of rotations reduces the induced voltage at the shorted windings, any abnormally excess current is not generated. The rotation speed reduces and the control is difficult. If the field winding is shorted in the modulation motor, the load is leakage reactance. Accordingly, the load cannot be controlled. However, the reactive short current generates synchronous torque which corresponds to $I_2 \sin\alpha$ in the equation (5). Since the synchronous torque has a property that it always equilibrates to the load torque of the rotor, the load torque determines the synchronous torque and the reactive load current. Therefore, there is no case that abnormally excess current is generated. The active load current proportional to the product of the synchronous torque and the rotation speed is supplied from the AC power source. Therefore, the modulation motor is different from the squirrel case induction motor in the rotation speed characteristic. Since there is no load in the field winding, the structure can be simplified and it can be employed for a servo motor having a relative small capacity. For instance, there is a relative relation that a conventional brushless motor corresponds to the modulation motor and the servo motor corresponds to the mechanical modulator or modulation amplifier. The modulation motor having a short winding has an advantage in removal of the drawback of the conventional brushless motor since the synchronous torque does not change if the rotation speed is changed by the mechanical modulator or modulation amplifier.

RELATION TO INDUCTION MOTOR

In the two- or three-phase induction motor, when a single-phase load is connected to one of phases of the secondary winding, the structure of a single-phase motor can be accomplished but the motor does not rotate. The rotary field induces a voltage at the secondary winding and the product of the single-phase load current and the DC main magnetic flux alternately inverts directions mutually dependent upon the AC power source frequency to generate a vibration torque. However, since the rotor has inertial force, the vibration is almost negligible. Since the single-phase load current has no DC current component, any continuous torque is not generated in a constant direction in conjunction with the DC main magnetic flux. The induction motor is an equivalent transformer and the induced voltage at the single-phase secondary winding is proportional to the DC main magnetic flux. In this case, there is nothing corresponding to the delay angle in the equivalent transformer. If a load is connected to each phase of the two- or three-phase induction motor and it is rotated, a delay angle necessary for the rotation is generated, so that the motor continuously rotates. However, the rotation speed is decreased because of slip in the torque.

Assume that a three-phase induction motor having the same output is driven in parallel to the three-phase modulation motor by a common three-phase power source. If the exciting current is identical in each phase of the three-phase power source, since the three-phase induction motor and the three-phase modulation motor generates the same alternate magnetic flux, the exciting winding has the same number of turns and the same structure. In this case, the three-phase load is formed of three-phase thermistors having the same arrangement. The modulation motor reduces the rotation speed by the mechanical modulator or modulation amplifier and has the torque equal to that of the three-phase induction motor which keeps the same output and rotation speed. For instance, if the rotation speed reduces the torque increases. Thus, there is no difference between the modulation motor and the induction motor in the drive characteristics and efficiency.

Figure 8A:
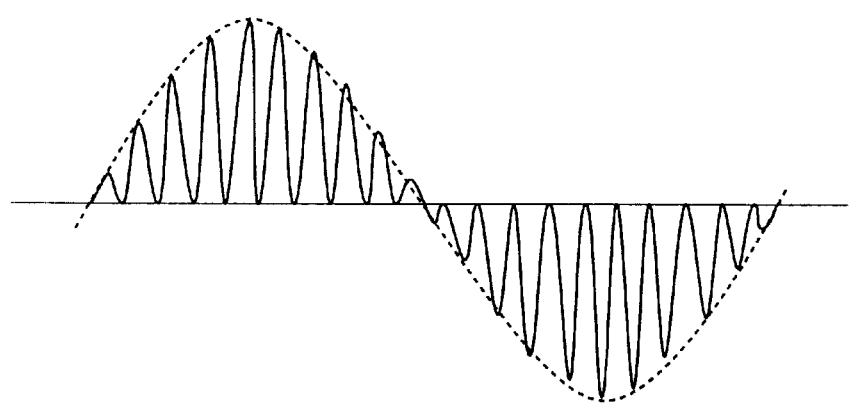
FIGS. 8A to 8C are diagrams showing exciting voltage waveforms of each phase of a three-phase induction motor generated when power source voltages to the induction motor are switched between the on state and the of f state with a high speed.
Figure 8B:
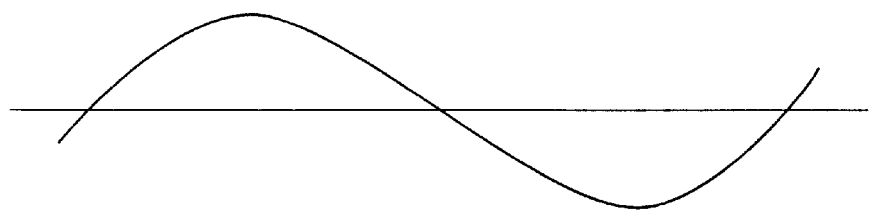
Figure 8C:
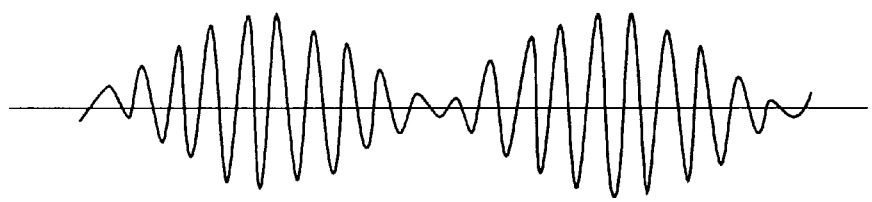

If the three-phase power is periodically switched between the on state and the off state synchronously in each phase in the three-phase inductor motor, the exciting voltage and DC main magnetic flux can be represented in an intermittent form by increasing the switching rate. Since the torque is generated in the induction motor based on an average value in intermitting the DC main magnetic flux, the operation is not basically changed and continuously rotated. In FIGS. 8A to 8C, the exciting voltage of each phase is shown in FIG. 8A, and FIGS. 8B and 8C shows components corresponding to the three-phase voltage having the power source frequency contained in the exciting voltage shown in FIG. 8A and the carrier voltage having the switching frequency, respectively. The carrier voltage component has the wave height value determined based on the sine wave of the three-phase power source voltage. However, each phase of the three-phase power source changes the polarity and as a result the carrier voltage components alternately invert the phases. Since the three-phase voltage component is smaller than the power source voltage and generates the rotation magnetic field, the induction motor reduces the torque and the rotation speed. The voltage component of each phase shown in FIG. 8C changes depending upon the instantaneous value of the phase at which the power source voltage is switched. The components of respective phases of the three-phase voltage shown in FIG. 8B are synthesized to generate the DC main magnetic flux having a predetermined amplitude. Similarly, the components of respective phases of the carrier voltage shown in FIG. 8C are synthesized to generate a single-phase carrier voltage having a predetermined voltage. The single-phase carrier voltage is amplitude-modified by the components of each phase of the three-phase voltage to have the waveform shown in FIG. 8C in each phase. Therefore, the components of the three-phase voltage function as three-phase modulation voltages which are required for the amplitude modulation. The waveforms of respective phases shown in FIG. 8C are synthesized to generate the alternate rotation magnetic field and each of the waveforms corresponds to the voltage $e_a$ shown in FIG. 1. However, the power source frequency is equal to the modulation frequency and the alternate main magnetic flux rotates in synchronous with the DC main magnetic flux of the rotation magnetic field.

The three-phase secondary windings of the three-phase induction motor have a predetermined angle difference of $2\pi/3$ between every two windings. The single-phase carrier voltage having a predetermined amplitude has no relation to slip and an induced voltage having the same frequency as the carrier frequency is generated in each phase of secondary winding. However, there is a difference in amplitude and the phase having the same phase as or opposite phase to that of the single-phase carrier voltage. If the induced voltage of respective phases are synthesized, they are cancelled from each other to be zero. Accordingly, if the components of the three-phase load current are synthesized, they are cancelled from each other not to generate the synchronous torque based on the alternate rotation magnetic field. This means that in the three-phase induction motor, the rotation magnetic field and the alternate rotation magnetic field are simultaneously generated but the alternate rotation magnetic field is not used. Since the switching operation of power source satisfies all the conditions necessary for the operation shown in FIGS. 1A to 1C, the switching operation corresponds to the mechanical modulator.

If the three-phase secondary windings for respective phases are connected in series, a single-phase winding is equivalently formed and the single-phase load can be connected. The structure is identical to that of the single-phase modulation motor having three-phase stator winding as already mentioned above. Accordingly, since the rotor rotates at the same speed as the rotation magnetic field of the three-phase power source, the DC main magnetic flux of the rotation magnetic field has no function to generate any induced voltage at the secondary winding. This means that the induction motor does not use the rotation magnetic field, and since the induction motor is used as the single-phase modulation motor any slip is not generated. Further, if a thyristor is used as the single-phase load, the DC component of current rectified by the thyristor corresponds to the DC field current of the synchronous motor and the AC component thereof corresponds to the AC field current of the modulation motor. Therefore, the induction motor can be used in the synchronous motor and the single-phase modulation motor. There is no difference in rotation speed between the rotation magnetic field and the alternate rotation magnetic field. Two synchronous torques generated in the rotor are synthesized in the same direction to generate the synthesized synchronous torque of the rotor. If the above-mentioned presumptions are provided, the close relation is between the induction motor and the synchronous motor and between the induction motor and the modulation motor. The relation indirectly verifies that the operation principle of the modulation motor is reasonable and valid.

In the actual modulation motor, the rotation speed can be controlled in a wide range using the mechanical modulator or modulation amplifier. Therefore, only the alternate rotation magnetic field is used with no relation to the rotation magnetic field and the alternate main magnetic flux and the synchronous torque can be increased.

RELATION TO SELSYN MOTOR

In the selsyn motor the transmitter and the receiver both having the same structure correspond to the mechanical modulator and the modulation motor, respectively. Therefore, the selsyn motor has the close relation to the present invention. However, the load of the modulation motor corresponds to the single-phase AC power source of the receiver. Thus, there is a difference in the structure between the selsyn motor and the present invention. The transmitter and receiver of the selsyn motor are excited by a common single-phase power source to generate the same alternate main magnetic fluxes. Compared to the induced voltage generated in the stator winding of the receiver, the voltage difference of the induced voltages between the transmitter and the receiver is small and changed dependent upon the rotation speed. There is a drawback in that the synchronous torque is small and changes dependent upon the rotation speed. Further, since the rotation speed generates the spontaneous torque to prevent the synchronous torque, there is another drawback in that the rotation speed is unstable. The reason was already mentioned. Therefore, the rotation speed cannot be increased. Since a mechanical output cannot be increased in the selsyn motor, it is an object to transfer the mechanical angle deviation. Thus, there is no application as an AC machine in which the synchronous torque is increased.

In the modulation motor there is a new application field as an AC machine in which the synchronous torque is increased by changing the load of the field winding. The rotation speed can be controlled by the mechanical modulator or modulation amplifier. Therefore, one object of the present invention is to provide a motor in which the synchronous torque and the rotation speed can be controlled in a wide range. The present invention has a new principle as the advantage to eliminate the drawbacks in the synchronous motor and induction motor and the modulation motor has the inherent principle and characteristics. If the load of the field winding is shorted, a power selsyn is formed which eliminates the drawbacks in the selsyn motor. However, the energy required to control the mechanical modulator or modulation amplifier has no relation to the synchronous torque. This was already described. The power selsyn has a new application field as a power servo motor and a non-stage transmission controlled by the small energy. The synchronous torque is increased in proportional to the mechanical output of the rotor. However, the synchronous torque and excess short current are not generated because of an equilibrium function in the stop state. Armature reaction and reactance preventing the load current can be reduced so that the efficiency is improved, resulting in increasing of the synchronous torque. If the secondary windings of two induction motors having the same structure are connected in parallel and the induction motors are synchronously operated, the induction motors function as a power selsyn. However, since there is interference in torque between the rotors, it is difficult to control the rotation speed. If the rotation speed is reduced by controlling an exciting voltage, the torque is also reduced. The power selsyn of the modulation motor does not have such a drawback and remarkably improves the synchronous torque of the selsyn motor.

DRIVING CHARACTERISTIC OF MODULATION MOTOR

Figure 9:
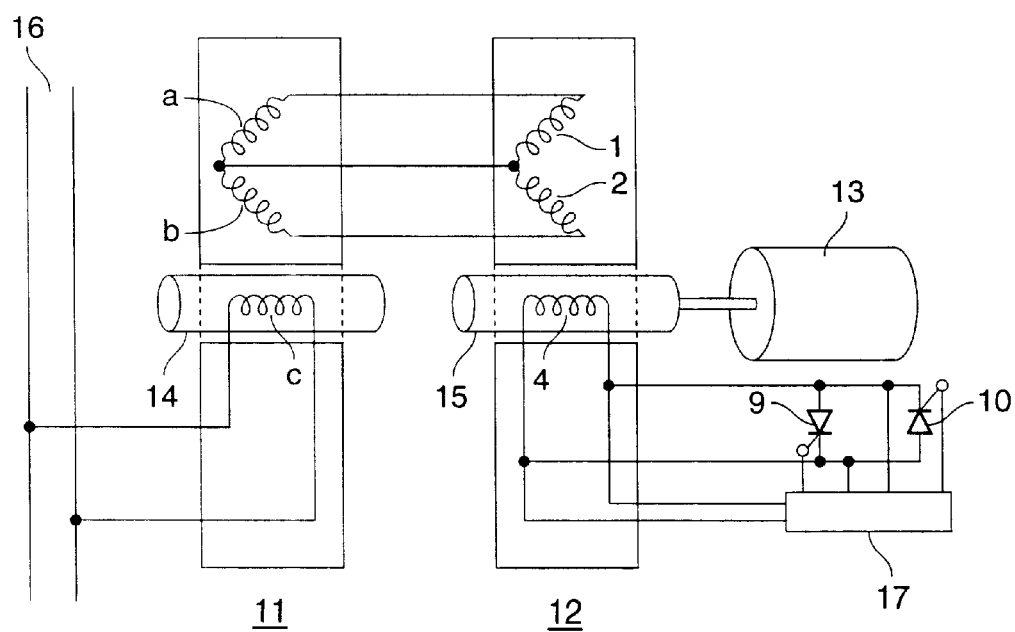
FIG. 9 is a schematically structural diagram showing of the modulation motor having constant rotation speed characteristic.

FIG. 9 is a schematic diagram showing a case in which the mechanical modulator 11 is rotated with a predetermined speed by external force and the modulation motor 12 rotates a mechanical load 13 in synchronous with the rotation of the mechanical modulator 11. In this case, a constant rotation speed characteristic is accomplished. For instance, the mechanical load 13 represents an electric car, automobile car or machine tool and has a different structure depending upon the application. However, in the electric circuit, the windings a and b of the modulator 11 are connected to the windings 1 and 2 of the modulation motor 12, respectively. Since the external force functions in the same manner as that of the selsyn motor, a unit such as a motor for applying the external force is omitted in the figure. The external force may be applied manually. The exciting winding c of the rotor 14 induces voltages in the two-phase windings a and b of the modulator 11 and the induced voltages excite the two-phase windings 1 and 2 of the modulation motor 12. Accordingly, a constant single-phase voltage is generated in the single-phase winding 4 of the rotor 15. In this case, the thyristors 9 and 10 connected to the rotor 4 are load. The gate voltages of the thyristors are controlled by the phase control circuit 17 so that the load current can be changed. Since the load current has no function to change the rotation speed, the constant rotation speed characteristic can be kept. However, since the rotors c and 4 are rotated, slip rings are required to supply power to the power source 16 or the thyristors 9 and 10 but they are omitted in the figure.

Consider that the structure shown in FIG. 9 is modified such that the external force is removed and the rotation axes 14 and 15 are coupled to each other to have a predetermined constant and small angle difference. FIGS. 10A–10E schematically shows the modified structure. In this case, if the phase control circuit 17 controls the thyristors 9 and 10 such that the constant load current is kept, the constant rotation torque characteristics can be accomplished. The constant synchronous torque is generated in the modulation motor because of the constant load current and the generated constant synchronous torque acts as the external force to the modulator 11. Accordingly, the change of the rotation axes 14 and 15 in the rotation speed has no relation. The constant synchronous torque always equilibrates to the load torque in the mechanical load 13, so that the constant load torque can be kept. In this case, the product of the constant load torque and the rotation speed corresponds to the mechanical output of the mechanical load 13. Thus, if the mechanical load is changed, the rotation speed is changed without changing the constant load torque and the constant synchronous torque. There is no function to prevent the change. In this manner, in the structure shown in FIGS. 10A–10E, the rotation speed changes but the constant torque characteristics is kept.

In the structure shown in FIG. 9, the value of constant rotation speed is changed by changing the external force and in the structures shown in FIGS. 10A–10E, the value of constant synchronous torque is changed by changing the load current. Thus, the modulation motor has two types of characteristics, i.e., the constant rotation speed characteristic and the constant synchronous torque characteristic. Since the modulator 11 supplies the power only from the power source 16 to the modulation motor, the modulator 11 and modulation motor 12 need to have the same power capacitance.

Since there are differences in driving characteristics between the structure shown in FIG. 9 and the structure shown in FIGS. 10A–10E, the main differences will be described below.

(1) If the active load current proportional to the supplied power is controlled by the thyristors 9 and 10, the reactive load current proportional to the synchronous torque is changed. The synthesis current of the active load current and the reactive load current is the actual load current and the power factor of the power source 16 changes. The characteristic is the same as that in a case that the output of the induction motor is controlled by thyristors connected to the secondary winding by changing the supplied power and the torque and the examples of the induction motors employed widely in conventional various equipments verify the characteristic.

(2) In the structure shown in FIG. 9, since the load torque of the mechanical load 13 generates a delay angle, the modulation motor 12 can have the output. In the structure shown in FIGS. 10A–10E, since the angle difference between the rotation axes 14 and 15 forms the delay angle, a sufficiently small delay angle needs to be provided in advance in order to generate the output. The reason why the delay angle is made sufficiently small is that the armature reaction can be almost removed.

(3) In the structure shown in FIG. 9, if the load torque of the mechanical load 13 is increased in excess, the equilibration between the synchronous torque and the load torque is broken so that the step out is caused. However, in the structures shown in FIGS. 10A–10E, since the constant synchronous torque characteristic is kept, the step out is not caused.

(4) The structures shown in FIGS. 10A–10E have the same driving characteristic as that of a DC series motor having the constant torque characteristic.

The modulation motor having the constant torque characteristic can be applied to a constant torque driving type of equipments such as an electric car, an automobile car, a cargo handling equipment, a crane, and a machining tool. Since brushes and commutators which are necessary for the DC series motor having the constant torque characteristic are not required in the modulation motor, the reliability of work can be increased.

Figure 10A:
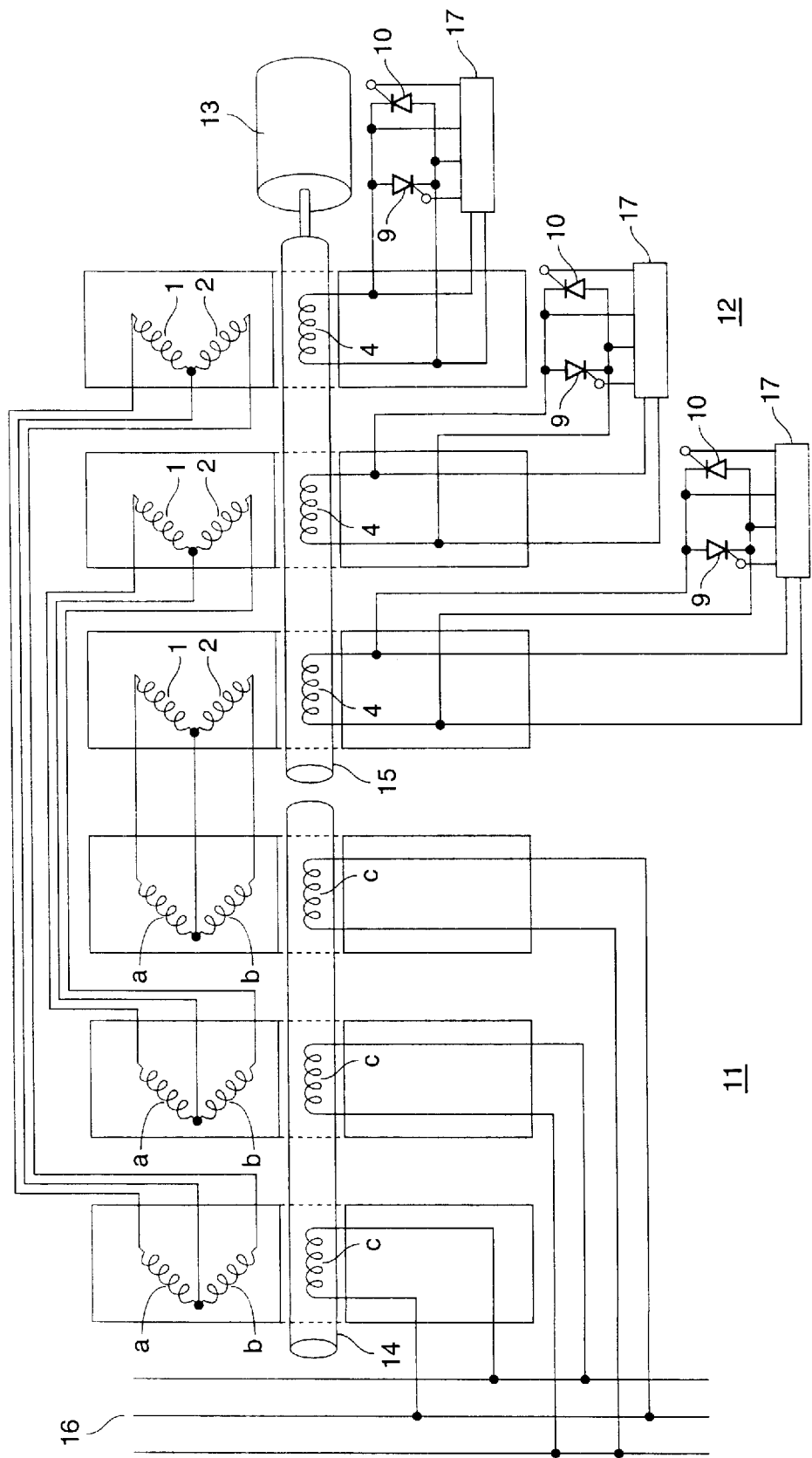
FIG. 10A is a 3-phase modulation control type motor in which 3 sets of single-phase modulation motors are arranged with an angle difference of 2π/3.

FIG. 10A is a 3-phase modulation control type motor in which 3 sets of single-phase modulation motors are arranged with an angle difference of approximately $2\pi/3$. Each phase of a 3-phase power source 16 supplies power to a corresponding exciting winding c on a rotor 14 of a mechanical modulator 11. As the rotor 14 is rotated by an external force, the exciting windings c induce voltages in corresponding windings a and b of the modulator 11. The windings a and b are connected to windings 1 and 2 of a modulation motor 12. The induced voltages in the windings a and b excite the windings 1 and 2. Accordingly, voltages are generated in windings 4 of a rotor 15 of the modulation motor 12. Pairs of thyristors 9 and 10 are connected to the windings 4 as an electrical load. The thyristors are controlled by control circuits 17 to change the load current. The load current controls torque communicated by the rotor 15 to a mechanical load 13, without affecting rotation speed.

Figure 10B:
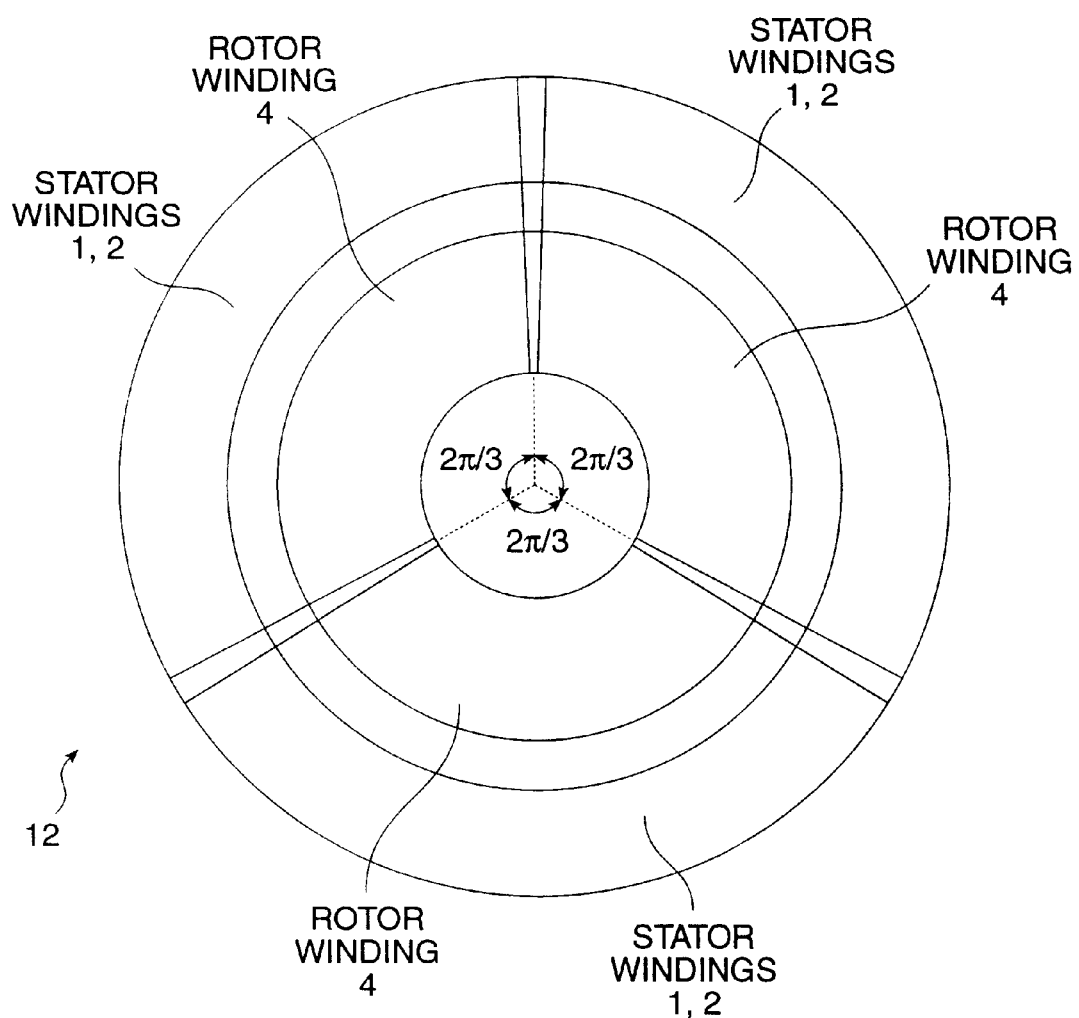
FIG. 10B is a 3-phase modulation motor in which 3 sets of single-phase modulation motors are accommodated in a pair of rotor and stator with an angle difference of 2π/3.

FIG. 10B is a 3-phase modulation motor 12 in which 3 sets of single-phase modulation motors are accommodated in a pair of rotor and stator with rotor windings 4 and stator windings 1 and 2, wherein an angle difference is approximately $2\pi/3$.

Figure 10C:
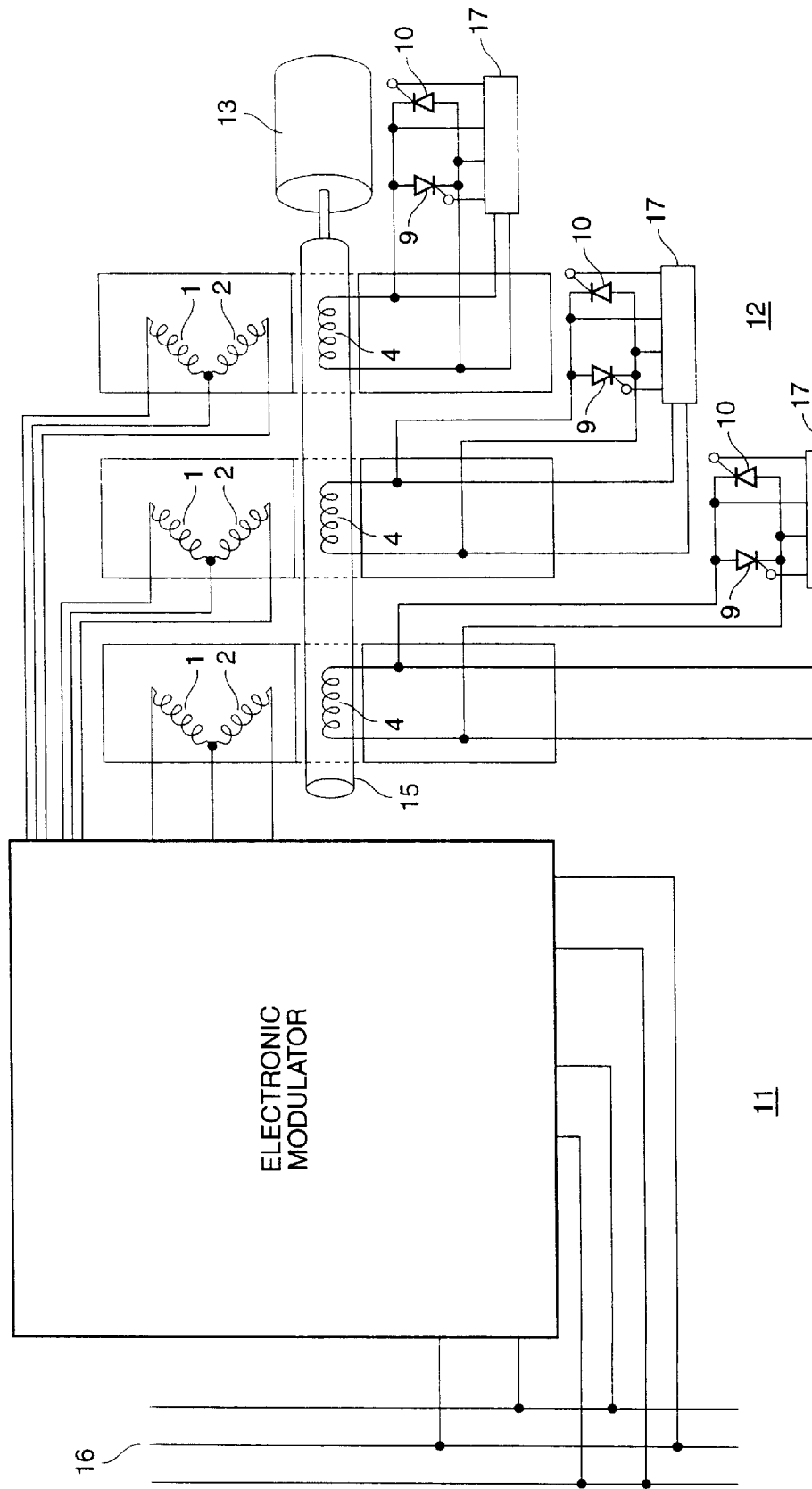
FIG. 10C is a 3-phase modulation control type motor using an electric modulator in which 3 sets of single-phase modulation motors are arranged with an angle difference of 2π/3.

FIG. 10C is a 3-phase modulation control type motor using an electric modulator in which 3 sets of single-phase modulation motors are arranged with an angle difference of approximately $2\pi/3$. FIG. 10C is similar to FIG. 10A, except that excitation of the windings 1 and 2 is performed by a modulator 11 that is an electronic modulator. The electronic modulator 11 is connected to the windings 1 and 2. The electronic modulator 11 generates voltages analogous to the voltages that in FIG. 10A were generated by a mechanical modulator 11.

Figure 10D:
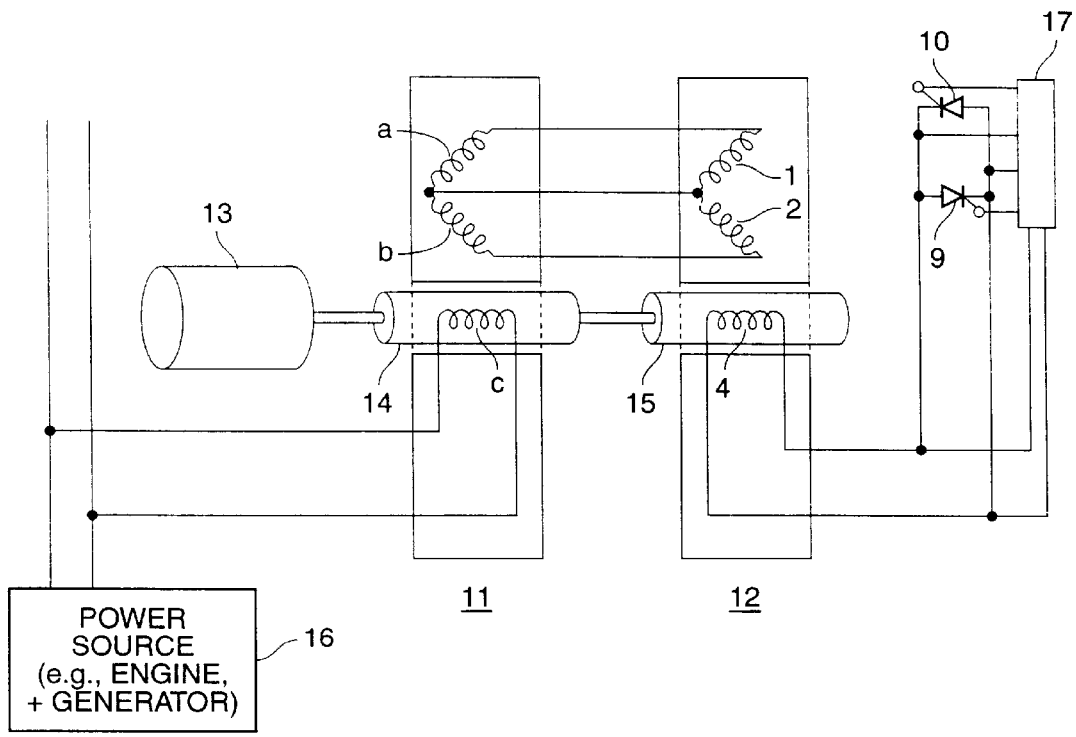
FIG. 10D is a single-phase modulation control type motor.
Figure 10E:
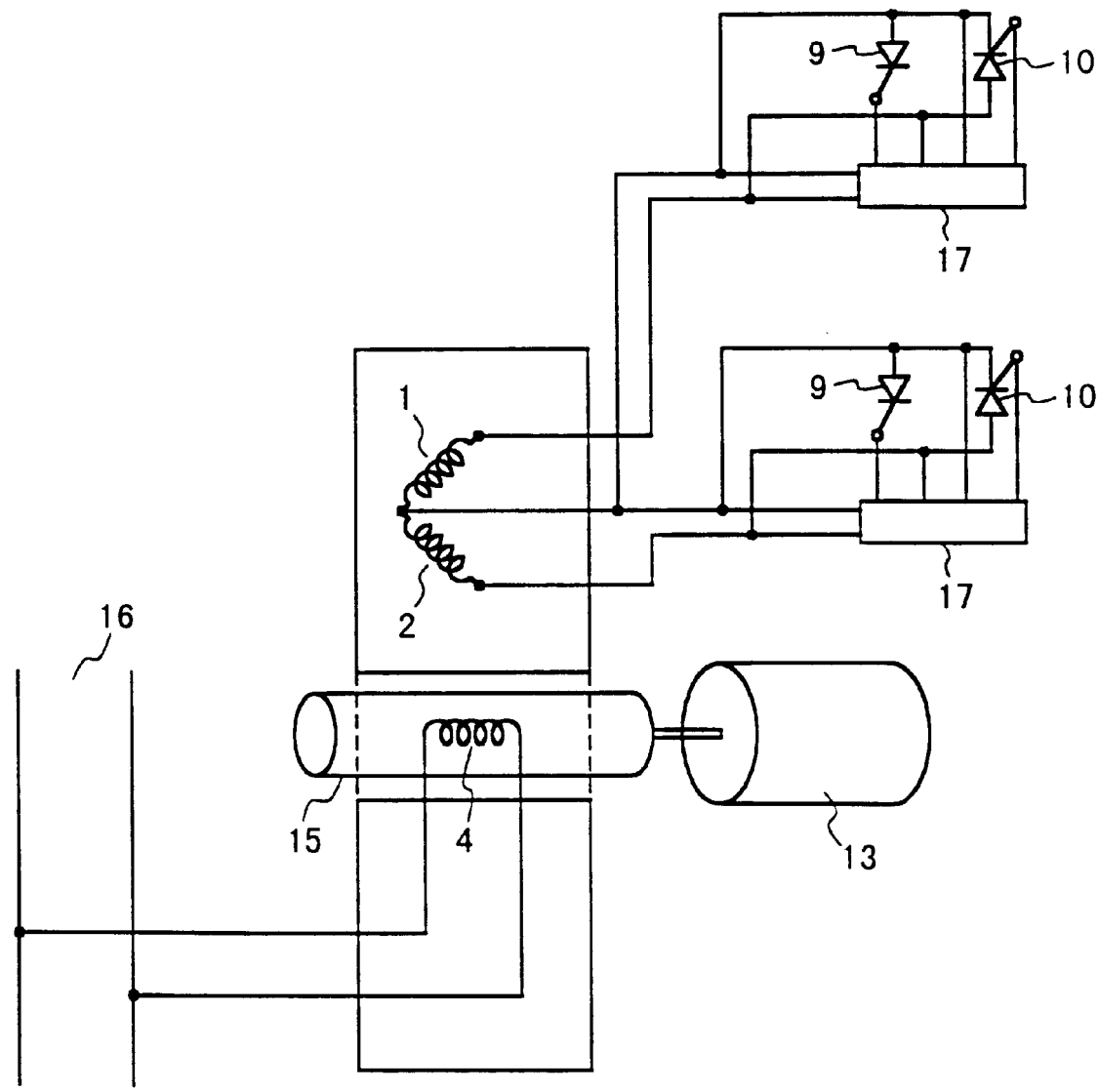
FIGS. 10E is a single-phase modified modulation control type of motor.

FIGS. 10D and 10E shows a single-phase modified modulation control type of motor. A rotor winding 4 functioning as an exciting winding is connected to an AC power supply line 16. A shaft of a rotor 15 is connected to a mechanical load 13. A control section is connected to each of stator widings 1 and 2 functioning as field windings. The control section is composed of thyristors 9 and 10 functioning as a load and a control circuit 17 for controlling the thyristors 9 and 10. The trigger points of the thyristors 9 and 10 are controlled by the control circuits 17 so that active current and inactive current are controlled. As a result, a delay angle is controlled so that the rotor 15 is rotated to rotate the mechanical load 13.

MODIFIED MODULATION MOTOR

In FIG. 9, when the modulator 11 has the same structure as that of the modulation motor 12 and rotates in synchronous with the modulation motor, the modulator 11 can be used commonly to the modulation motor 12, and the structure can be simplified. The modulation motor having the unified structure is named temporarily "a single-phase modified modulation motor". Therefore, there is the difference between it and the single-phase modulation motor shown in FIG. 9.

FIG. 10D is the structure of a single-phase modified modulation motor. A field winding 4 on a rotor 15 driving a mechanical load 13 is coupled to the AC power source 16 as an exciting winding. In this case the two-phase windings 1 and 2 function as field windings. The thyristors 9 and 10 are coupled to the two-phase windings, respectively. The thyristors 9 and 10 constitute the load. The thyristors are controlled by control circuits 17. However, in this case, the modified modulation motor having the common use cannot be given any delay angle to the rotor in relation to the alternate main magnetic flux. Therefore, $\beta=0$ in the above equation (5) and there is no synchronous torque so the rotor is not rotated. If a small difference is provided between the reactive load current components respectively flowing the two-phase windings 1 and 2 by controlling by the thyristors and the small difference and the constant ratio are respectively kept, the vector of the synthesis reactive load current obtained by synthesizing the reactive load current components shifts the angular direction. Therefore, spontaneous torque is generated in the rotor and two-phase winding 1 and 2 in which the shifted angle functions as the predetermined delay angle. As a result, the rotor is continuously rotated. In this case, in order to eliminate the armature reaction, the delay angle is necessary to be sufficiently small. In the structures shown in FIGS. 10A–10E, the difference in angle between the rotation axes 14 and 15 is utilized as the delay angle. However, in the modified modulation motor, the change of the synthesis reactive load current in angular direction is utilized as the delay angle in relation to the alternate main magnetic flux. Therefore, the above equation (5) is satisfied as the same function in the both cases. For instance, the torque generated by reactive load current flowing through the secondary winding in the rotor of the known single-phase induction voltage regulator corresponds to the spontaneous torque. Accordingly, this means that the generation principle of the spontaneous torque is verified. However, since there is only one secondary winding in the existing induction voltage regulator, the induced voltage and the reactive load current are reduced in the secondary winding by the rotation of the rotor. Thus, the induction voltage regulator is different from the modified modulation motor in that the rotor cannot be not continuously rotated. The single-phase modified modulation motor of FIG. 10E has the same constant torque characteristic as the structure shown in FIGS. 10A, 10C, and 10D. In order to change the synchronous torque, the magnitude of synthesis reactive load current needs to be changed without changing the ratio between the reactive load current components flowing through the two-phase windings 1 and 2 by the thyristors.

In a three-phase modified modulation motor, the respective phases of the three-phase power source 16 are coupled to three rotor windings of three sets of the single-phase modified modulation motor to generate the synthesis synchronous torque. Alternatively, three single-phase rotor windings or three two-phase stator windings are accommodated in a pair of iron cores with the same distance apart from each other, so that the three-phase modified modulation motor having a unified structure can be obtained. In the single-phase or three-phase modified modulation motor, two types of motor can be obtained by the exchanging only the rotor and the stator without exchanging the respective windings. Providing the exciting winding on the rotor or stator side and the two-phase field winding on the stator or rotor side, there is no difference of characteristics between the two types of motor. If the rotor is forcedly rotated by a prime mover in the single- or three-phase modified modulation motor, the function to generate power is achieved and the motor acts as a single- or three-phase modified modulation generator.

MODULATION GENERATOR AND MODIFIED MODULATION GENERATOR

In the modulation motor of FIG. 9 having the constant rotation speed characteristic, the synchronous torque always equilibrates to the load torque of the rotor in opposite directions. Accordingly, if the synchronous torque is rapidly reduced, the inertial rotation energy of the rotor and the mechanical load 13 achieves the same function as that of a prime mover. In this case, a lead angle is generated so that braking generation appears and the generated power is collected into the AC power source. Although the rotation direction is not changed, the delay angle is changed to the lead angle since the torque of the prime mover is greater than the synchronous torque.

In the modulation motor shown in FIG. 9, if the mechanical load 13 is replaced by the prime mover and the prime mover forcedly rotates the rotation axis in the same direction, the modulation motor acts as a modulation generator. This is because the lead angle is generated by the prime mover. The generated power is automatically supplied to the AC power source 16. This is the same as in the case of braking generation. In the synchronous generator, the supplied power varies with drifts because of the voltage difference between the AC voltage generated by DC exciting current and the AC power source voltage. However, such a voltage difference is not present in the modulation generator which is excited by the AC power source. The modulation generator has the same functions as those of the induction generator. In the modulation generator, if the torque of the prime mover varies, since the lead angle is changed, the supplied power varies. Therefore, in order to maintain the stability of power generation, it is desirable to add an automatic constant rotation speed control unit to the prime mover. In the modulation motor shown in FIGS. 10A–10E and the modified modulation motor both having the constant torque characteristic, the mechanical load 13 acts as a prime mover. If the prime mover rotates in an opposite direction, the delay angle is made to be the lead angle. As a result, these motors acts as a modulation generator. If the presetting of angle difference is switched from the delay angle to the lead angle and the prime mover rotates in the same direction, the modulation generator is obtained as described above. However, the rotation speed is determined based on the inherent characteristic of the prime mover.

If the prime mover can keep the constant rotation speed, the modulation generator fits for a constant rotation speed characteristic. In this case, since the lead angle is constant, the modulation generator is different from the already-mentioned modulation generator having the constant rotation speed characteristic. Since the load current can be changed in a wide range by the thyristors connected to the field winding, the generated power can be also controlled in a wide range. Since a rotation speed variation ratio is generally great in the prime mover, the modulation signal frequency and the rotation speed are varied in the modulation generator or modified modulation generator whose rotation axis is rotated by the prime mover. However, since the preset lead angle is kept in the modulation generator and modified modulation generator both having the constant torque characteristic, varying generated power is all supplied to the AC power source so long as the prime mover has torque. Although the rotation speed varies, it is not necessary to add an automatic constant rotation speed control unit to the prime mover. Further, since there is no armature reaction and reactance voltage drop by the reactance is not caused, the hunting which is one drawback in the synchronous generator can be prevented and the generation efficiency can be improved. For instance, in a conventional pollution free power generating plant utilizing tidal energy, windy energy, sun shine energy, and exhausted heat and pressure from various plants, remarkable change of the prime mover in rotation speed was a problem. Although the total amount of pollution free energy is extremely great, the generation efficiency cannot be increased in the synchronous generator because of the variation of energy density. The above energy could not be utilized because the prime mover cannot keep the synchronous rotation speed in such a low energy level. The single- or three-phase modulation generator or modified modulation generator having the constant torque characteristic can solve the problem and therefore pollution free power generating plants could be readily developed. In the generator according to the present invention, since all the varying pollution free energy is converted into electric power so that a total amount of electric power can be increased, the generation efficiency can be improved. Since the automatic constant rotation speed control for the synchronous generator must be cut off from the prime mover because of low free energy, the electric circuit and the structure can be simplified as shown in FIGS. 10A–10E, resulting in economical effect. The modulation motor and the induction motor have substantially the same efficiency in principle, as already described above. Therefore, the modulation generator has less difference in efficiency from the induction generator and synchronous generator. The power capacity of the modulation generator or modified modulation generator has no relation to the operation principle. Since there is no armature reaction, the efficiency can be increased. Accordingly, if the modulation generator or modified modulation generator is applied to a hydraulic or thermal power generating plant, the drawbacks in the synchronous generator can be all removed. The thyristors connected to the field winding are required to control the power generation and the thyristors has less loss on the operation, resulting in reducing the weight for the effective power capacity. Generally, the automatic constant rotation speed control unit is employed for the prime mover in the hydraulic or thermal power generating plant. The structure can be simplified compared to the synchronous generator, since the control unit can be omitted in the present invention. The rotation speed of the prime mover needs not to be changed even in the exchanging power generating plant which supplies the generated power to another power system having a different power source frequency. In a pumped storage power generating plant, the synchronous generator is used. The synchronous generator is also used as a synchronous motor and a hydraulic turbine is used as a pump. In this case, however, the amount of pumped water cannot be controlled by changing the rotation speed. The modulation generator or modified modulation generator having the constant torque characteristic can be also used as the modulation motor or modified modulation motor and the synchronous torque can be controlled by the thyristors connected to the field winding. The amount of pumped water can be controlled in a wide range by changing the rotation speed by changing the synchronous torque. Further, if the active load current and reactive load current flowing through the field winding are controlled independently and separately, the AC machine has the same function as a so-called vector control type of induction generator or induction motor. The modulation generator or modified modulation generator having the constant torque characteristic has the inherent characteristic which is different from that of the synchronous generator. The present invention has as one object to apply the difference to the power generating plant such that the structure of plant is simplified and the generation efficiency is increased.

ADVANTAGES AND VARIOUS APPLICATIONS OF THE INVENTION

Since a conventional AC machine has a basic defect in the operation principle, the increase of performance is prevented in the industrial equipments in which the conventional AC machine is employed. The present invention provide a modulation control type of AC machine to remove the above drawbacks and this was described in the above summary.

However, it is difficult to make the advantages of the present invention sufficiently clear only by the structure. Therefore, the representative application examples will be described below in detail with respect to the difference from the existing technique and the advantages of the present invention.

(a) Industrial Robot

A servo amplifier and brushless motor are employed as the AC servo motor in the conventional industrial robot. The brushless motor is composed of a synchronous motor and there are many cases in which a permanent magnet is used for the DC magnetic field. If the rotation speed is increased in the servo amplifier by changing the frequency, the magnetizing current, DC main magnetic flux, synchronous torque and output of the synchronous motor are reduced. On the contrary, if the rotation speed is decreased, there is the possibility that magnetic saturation is caused. The mechanical modulator or modulation amplifier in the present invention corresponds to the servo amplifier. However, the modulation motor keeps a predetermined alternate main magnetic flux and controls the rotation speed by changing the modulation signal frequency. Therefore, the drawbacks of the brushless motor are eliminated. In the modulation motor of FIG. 9 having the constant rotation speed characteristic, the synchronous torque is controlled by the thyristors connected to the field winding and the armature reaction and reactance which are drawbacks in the synchronous motor are eliminated so that the driving characteristic is improved. If the power source frequency is increased without changing the amplitude of the alternate main magnetic flux, the number of turns can be reduced in each of the windings. As a result, the inertial force can be reduced as well as the size and weight of each winding. Accordingly, the quick response characteristic can be increased in the speed control. The mechanical modulator and modulation amplifier can have the small size and light weight. There is not the step out in the modulation motors of FIGS. 10A–10E and modified modulation motor both having the constant torque characteristic and the synchronous torque can be readily increased by changing the load of the field winding. The rotation speed changes in accordance with the synchronous torque and the mechanical load 13 of the rotor and this corresponds to the driving characteristic in the DC series type motor of the DC servo. However, since there is not necessary brushes and commutators, the reliability can be increased.

In a conventional remote-controlled robot so-called extremely severe situation working robot, a motor for moving around and a sensing unit are added to increase the weight. As a result, the quick response characteristic is lost. Therefore, by employing the modulation motor or modified modulation motor with the power source frequency increased, the weight of the robot can be reduced without changing the rotation speed and output. Thus, the conventional problems can be solved. In the conventional servo motor, the synchronous motor and induction motor causes many problems and the basic principles of these motor impose the limit on the performance of the servo motor. The modulation motor and modified modulation motor removes the limit. Further, the reduction of inertial energy through making the size small is utilized for performance improvement of the servo motor. For instance, in an artificial satellite, the weight reduction and reliability increase are required. Accordingly, if a servo motor created based on a new idea is employed, the improvement can be achieved.

(b) AC Electric Car

In the electric car, the control of speed and tractive force in a wide range is required. For this reason, a DC series type motor is employed for the DC electric car. However, there is a problem on reliability of the brushes and commutators because of severe control. In the AC electric car, there is a problem on the driving characteristic of the induction motor. For this reason, it is desirable that the single- or three-phase modulation motor or modified modulation motor having the constant torque characteristic of FIGS. 10A–10E. The modulation motor or modified modulation motor has the characteristic similar to that of the DC series type motor and constitutes a type of power servo with no brush and commutator and with armature reaction. Since the synchronous torque has no relation to the rotation speed, the power generated through braking using the synchronous torque is all collected to the AC power source, resulting in increase of use efficiency of power. Further, if the height of the electric car is decreased by increasing the power source frequency through small sizing, the tunnel construction for subway can be simplified. The modulation signal frequency or the number of periods of time are proportional to the speed and traveling distance of the electric car. Accordingly, they can be utilized for the speed control of the electric car and determination of a stop position based on program control. For instance, in a bullet train "Sinkansen" in Japan, if the conventional DC motor is replaced by the modulation motor or modified modulation motor, the structure and electric circuit can be simplified, resulting in decreasing of the weight of the electric car. If the modified modulation motor is employed, the mechanical modulator or modulation amplifier is not required and as a result of this the weight can be further decreased. In this case, the speed of the electric car is controlled by changing the synthesis reactive current while keeping constant the ratio between the reactive load currents flowing through the respective phases of the two-phase field winding.

Figure 11:
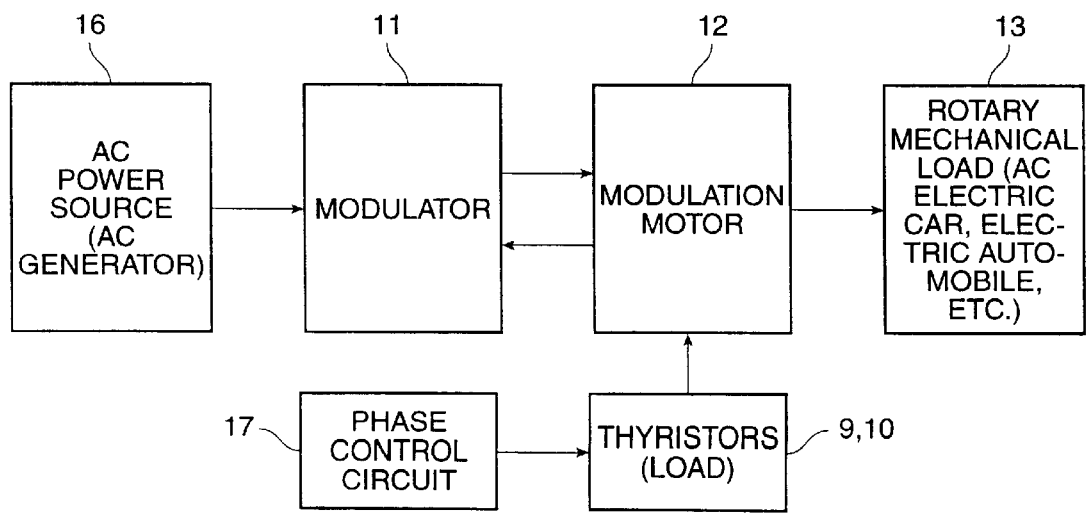
FIG. 11 is a block diagram showing a control system in FIGS. 10A–10E.

FIG. 11 is a block diagram showing an example of control system of the AC electric car. Since various sections correspond to the sections of FIGS. 10A–10E, respectively, the description is omitted by assigning the same reference numerals to the same components. The reference numeral 13 is the AC electric car. In FIGS. 10 and 11, the load current flowing through thyristors 9 and 10 are controlled by the phase control circuit 17, the modulation motor 12 changes the magnitude of synchronous torque. Since the rotor 15 is directly coupled to the rotor 14 and the synchronous torque is external force for the mechanical modulator 11, the mechanical modulator 11 changes the modulation frequency to control the speed of the AC electric car 13. Since the synchronous torque equilibrates to the mechanical load torque of the AC electric car 13, the load torque determines the speed of the AC electric car. FIG. 11 shows the control system. Accordingly, if the synchronous torque is changed in the modulation motor having the constant torque characteristic, the speed of the AC electric car 13 is changed. The product of the respective values corresponds to the output of the AC electric car. If an arrow from the modulation motor 12 to the mechanical modulator 11 is removed in FIG. 11, the figure is block diagram representative of the constant rotation speed characteristic of FIG. 9.

If the AC driving principle of the electric car is applied to equipments such as an elevator, cargo handling tool, and crane, the delay angle is changed to the lead angle by opposing the rotation direction. Accordingly, the weight load acts as the prime mover, and the generated power is collected to the AC power source. As a result, the power loss is not almost generated. The speed is controlled by the thyristors 9 and 10 as well as the output and the power generation. A vector control type of induction motor used in a rolling mill, paper machine, large size machining tool is a type of power servo which is controlled by thyristors. A control computer is complicated in the electric circuit and structure. If the active load current and reactive load current flowing through the field winding are separately controlled in the modulation motor and modified modulation motor, this control corresponds to the vector control. As a result, the structure can be simplified. The modulation motor and modified modulation motor can improve the driving characteristic to increase the efficiency because the armature reaction and the step out are not present. In a case where it is required that the constant rotation speed is precisely kept, an automatic constant speed control unit is necessary for the modulation signal frequency in the constant rotation speed characteristic or the thyristors in the constant torque characteristic. Generally, there are many industrial facilities requiring the same driving characteristic as that of the AC electric car and the application field is not narrow. An electric automobile, pump and conveyer are examples.

(c) Linear Motor Type of Electric Car

Figure 12A:
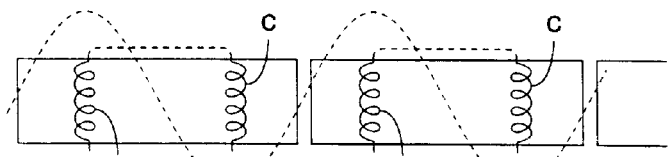

In the AC electric car, there are problems in slip of wheels which limits increase of the speed and endless maintenance of overhead lines for prevention of fault. If the modified modulation motor is deformed into a linear motor, the above drawbacks can be all removed. The mechanical modulator having the same structure as that of the modified modulation motor is cut at one position of the iron core and developed in a plane form. A plurality of rotors having the same structure are provided on a track so as to be adjacent to one after another and the statuaries are fixed to the lower surface of the electric car with a small gap so as to be apart from each other. As a result, the single-phase mechanical modulator is deformed into a single-phase linear motor. FIG. 12 illustrates the arrangement and the delay angle is not shown in the figure because it is very small. The exciting windings of the rotor are connected to each other in parallel and connected to the single-phase AC power source. The winding b which is cut together with the stator is represented by b/2. Further, the loads of the two-phase stator windings a and b of the stator are omitted and the two thyristors 9 and 10 are also omitted. In the windings a and b, if the reactive load currents are synthesized, the synthesis reactive load current corresponds to the reactive load current of the rotor 4 in FIG. 7, and β in the equation (5) is kept constant. Since the iron core is deformed in a flat form with respect to the center, each of pairs of windings has the two pole structure windings a, b and c and each winding and the magnetic flux change the angles in directions opposite to each other so as to be perpendicular to the surface of the gap and to all be parallel. The alternate main magnetic flux $\phi$ is generated by the winding c and there is no change in the relative relation and the induced voltages generated in each of the pairs of windings a and b because of the closed magnetic loop. In the single-phase linear motor, since a pair of forces $f_0$ which act in opposite direction to each other changes the angles in the opposite directions by $\pi/2$, the angles are actually made identical. Therefore, the synthesized force of FIG. 7 is $2f_0$ and the force $2f_0$ which acts in parallel to the gap is the thrust of the electric car. The alternate main magnetic flux $\phi$ generates attractive force in perpendicular to the gap through the same operation as an AC electromagnet between the iron core of the winding c and the iron core of the winding a or b. Since the attractive force is synthesized in the same direction as the direction of weight of the electric car, the electric car is prevented from being rising from the tracks.

The sine wave shown in FIG. 12 represent a density distribution of alternate main magnetic flux $\phi$ in the gap and the windings c is sequentially switched dependent upon the position of the traveling electric car to use the alternate main magnetic flux φ. The closed magnetic loop of the alternate main flux is represented by the dashed line. The alternate main magnetic flux changes in accordance with the angle θ shown in FIG. 6 and the position relation of the windings a and b corresponding to the change is shown in FIGS. 12B to 12F. A three-phase linear motor uses the respective phases of a three-phase AC power source as three single-phase power source and has three windings c and three sets of windings a and b, so that the three-phase linear motor has the same constant torque characteristic as shown in FIG. 12 in principle. The linear motor has the advantages in reduction of the electric car height and removal of overhead lines. As a result, economic effect can be achieved in which the tunnel construction for subway can be simplified. Further, since the electric car can be directly pulled by the thrust, there is no slip of wheels so that the speed up and acceleration are made easy. In a conventional superconduction type of electric car, it is necessary to reduce the electro-magnetic attractive force in the gap of the motor which functions as AC electromagnet for rising from the tracks. Accordingly, since any iron core is not used for the exciting winding, there is a drawback in that the exciting current remarkably increases. In the linear motor shown in FIG. 12, the electromagnetic attractive force is synthesized with the weight of the electric car. Further, in order to prevent the increase of the exciting current, the winding c having no electromagnetic coupling is opened from the power source. Although an induction motor type of linear motor is already practiced as a subway electric car in a city, overhead lines are employed and an induction plate on the tracks is used as the load necessary for the secondary winding. The tractive force and output are generated by the reactive load current and active load current, respectively. There is a drawback in that the power loss in the induction plate increases the temperature in the subway. Further, since the load of induction plate cannot be controlled, it is necessary to change the AC power source voltage for controlling the tractive force and output. The thrust and speed of the electric car are controlled by thyristors through the exciting windings a and b of the linear motor shown in FIG. 12. The characteristic corresponds to a DC series type of motor of a DC electric car and the constant torque characteristic eliminates the drawbacks on the torque characteristic in the induction motor type of linear motor. Further, since the thyristors have less power loss, the temperature of subway is not increased. However, in the linear motor, power sources for illumination and air conditioning and an auxiliary power source for controlling the electric car are required. A type of modified modulation generator or power converter in which a mechanical modulator is connected to the windings a and b to remove the amplitude modulation is used as the auxiliary power source. If the two-phase winding is rotated by the rotor in proportional to the modulation signal frequency, the amplitude modulation is removed from the induced voltage of the single-phase winding so that a constant voltage proportional to the AC power source can be obtained. Therefore, the constant voltage of the stator can be used as the auxiliary power source so that the auxiliary power is supplied. Therefore, the rotor must be rotated synchronously in proportion to the speed of the electric car. The synchronous motor is driven by the voltage in which the component of the frequency is reduced from the modulation signal in the windings a and b, and the component of the amplitude is amplified by another amplifier. There is no synchronous torque in the mechanical modulator because B=0, and the synchronous motor does not require the torque for the rotation. Therefore, this corresponds to no-load operation and there is almost not the delay angle. As a result, the auxiliary power source is not changed by the power output and has the same phase as that of the AC power source.

(d) Electric automobile

Since the speed is controlled in a wide range by an engine in a gasoline automobile, the total efficiency is decreased. Thus, increasing of fuel results in increasing of exhausted gas and carbon dioxide gas. In a conventional electric automobile, since the efficiency is decreased because of the weight of battery, the consumption power is great so that the number of times of charge is increased. If the electric power produced by a thermal power generating plant is used for the charging, the consumption power indirectly increases pollution gas and carbon dioxide gas. If the single- or three-phase modulation motor or modified modulation motor having the constant torque characteristic is connected to an AC generator having a constant AC voltage and a constant power source frequency which generator is directly connected to an engine, a new non-stage transmission of the electric automobile can be obtained. The structure and control system are shown in FIGS. 10 and 11, respectively and in the figures the reference numeral 13 corresponds to the electric automobile.

Generally, the number of rotations is large and constant when the engine reaches the maximum efficiency. Accordingly, the direct coupling type of engine generator rotating with the maximum efficiency and the constant rotation speed has the power source frequency increased, so that the weight and size can be reduced. The AC generator, the mechanical modulator or modulation amplifier, and the modulation motor or modified modulation motor have the weight and size reduced together as a result of increasing of the power source frequency. In the gasoline automobile, the weight of driving axis cannot be reduced. The power supply wires from the AC generator corresponding to the driving axis can be relatively reduced in the weight. In the AC generator, it is not necessary to change the AC power source voltage for speed control and the increase of weight is not required. The transmission of the gasoline automobile corresponds to the load of the exciting winding. Since the thyristors are used in the load, the weight can be further reduced.

One aspect of the present invention is to make the new electric automobile drastically light by decreasing the weights of various sections. As a result, the pollution gas and carbon oxide gas can be remarkably reduced through the decreasing of fuel consumption and the increasing of efficiency. Further, if the engine is rotated with a constant rotation speed, alternate fuel such as natural gas, methanol, and hydrogen gas having less exhausted gas can be used for the engine and the driving characteristic and efficiency of the engine can be improved. Since there is not step out and armature reaction and reactance preventing the load current is not generated, this can be utilized for increasing the start torque and acceleration in the automobile.

Generally, it is conventionally consistent technical problem to make the automobile light. If the weight of the electric automobile can be reduced, the cost can be reduced. Further, the damage upon the collision can be decreased through the reduction of inertial movement energy. In a four wheel drive type of automobile, the respective wheels are driven in parallel by the modulation motors or modified modulation motors in which differential gears are removed, respectively. With the thyristors in the load, since an electric protection circuit can be readily used in common, the prevention of run away and the improvement of reliability could be achieved. The electric car corresponds to a large size of electric automobile if the tracks and overhead lines are removed. The increase of operability, the reduction of vibration and noise, and improvement of comfortability can be achieved. For instance, the engine generator is used in common to the control auxiliary power source of the electric automobile. The engine generator is provided at a position not influenced by the exhausted gas.

If the modulation motor or modified modulation motor is applied to a light car, a two wheel car, a bicycle, and a wheelchair, etc. and an automatic electric control circuit is provided for the thyristors, the operability and safety are increased. For instance, there is a possibility that the modulation motor or modified modulation motor is sued for man power saving in factories and hospitals, and for purpose of delivery and communication.

(e) Control Device of Fluid

Generally, the supply pressure of fluid or gas changes depending upon specific gravity, height, supply distance, the amount of supply, cross sectional area of a pipe. For instance, in a multistory building, a water storage tank is required because of lack of pressure of city water channel, resulting in degradation of water quality. The lack of supply pressure can be automatically compensated by a pomp. However, if an induction motor for driving a pump is frequently started, excess start current flows so that noise is generated and fault is caused. In the modulation motor or modified modulation motor of FIGS. 10A–10E having the constant torque characteristic, constant synchronous torque is generated to equilibrate to the supply water pressure by keeping the load connected to the field winding constant and continuously compensate for lack of the water pressure to maintain the water pressure. It is not necessary to switch the AC power source between the on state and the off state by always keeping the load current constant to have no relation to the rotation speed, so that the structure can be simplified, resulting in increasing the reliability. The constant synchronous torque and the same rotation direction can be kept by the delay angle. Therefore, the modulation motor or modified modulation motor prevents the back flow and has the function as a power servo to change the rotation speed in proportional to the amount of water supply.

For instance, the city gas supply system employs the same principle to maintain the supply pressure constant. If the city water in the principle of water supply system is replaced by cable, band plate and magnetic tape, an automatic constant tension winding apparatus can be obtained. The winding speed is changed depending upon the constant tension and mechanical load. If the field winding is shorted, the modulation motor has the structure simplified and the driving characteristic at this time was already described. The mechanical modulation or modulation amplifier connected to the simplified modulation motor constitutes a power selsyn having small energy required for the control. Long wiring are for the purpose of remote control and the synchronous torque is proportional to the mechanical load of the modulation motor. The power selsyn has the same functions as a conventional selsyn motor but the torque can be increased remarkably. Accordingly, the supply pump for a large size water tank can be used to automatically control a water supply speed, an amount of water supply and a designated water level by program control of the mechanical modulator or modulation amplifier. In a large size carrier car or industrial facilities, the power selsyn can be used as nonstage transmission with less control input to have the advantages in the remote control of operation and speed control. For instance, a supply main pipe can be selectively closed by the strong synchronous torque in the city gas to endure earthquake and to prevent the expansion of fire. A water gate can be selectively remote controlled to supply water for industry or agriculture purposes in a dam and the supplies of fuel, cooling water and powder material can be synchronously switched in a large size heating furnace of iron industrial or chemical factory. The reliability can be increased in the severe work circumstances by the simplified structure and the strong torque. The power selsyn only requires remarkably small energy to control, the mechanical modulator or modulation amplifier reduces the power loss and has no relation to the torque directly. Therefore, the power selsyn can be applied to a new field as a type of non-stage transmission which generates strong torque with small control energy. Since the synchronous torque is removed because of the equilibrium function in the stationary state, excess short current does not flow.

(f) pumped storage power generating plant

Generally, in the pumped storage power generating plant, a three-phase synchronous generator is inversely operated as a three-phase synchronous motor and a water turbine is also used as a storage pump. However, since the synchronous speed is constant, the pumped storage cannot be controlled by changing the synchronous speed. Accordingly, there are examples in which a three-phase induction motor is employed. The three-phase secondary winding is excited by a DC power source, it can be used in place of the synchronous generator and synchronous motor. A three-phase exciting power source is connected to the three-phase secondary winding of the three-phase induction motor and the pumped storage can be controlled in a wide range by changing the rotation speed by changing the slip frequency. There is a drawback in the interference operations between the induced voltage generated in the secondary winding by the DC main magnetic flux because of the slip frequency and the three-phase exciting power source. However, it is necessary that the slip frequency, reactive load current and active load current required for the rotation speed, torque and output of the storage pump must be controlled separately by the three-phases exciting power source. Therefore, a control circuit for controlling the storage pump is complicated. The control method correspond to the so-called vector control type of induction motor. Accordingly, a computer required for the control imposes economical cost. If the power for pumping is increased, the three-phase exciting power source needs to have more increased facility capacity, resulting in economical drawback.

If the three-phase modulation motor or modified modulation motor having the constant torque characteristic is employed, a three-phase AC power source 16 is used in FIGS. 10A–10E and the three-phase load of the field winding corresponds to a three-phase exciting power source of the three-phase induction motor in the structure. However, the loss in the thyristors as the load loss is less in the operation state, resulting in increasing the efficiency. The rotation speed is controlled through the synchronous torque by the thyristors keeping the constant delay angle so that the pumped storage can be controlled in a wide range. However, a vector control system which is used for the three-phase induction motor needs not to be employed for the modulation motor or modified modulation motor. Therefore, the structure can be simplified. If the torque of the water turbine is increased more than the synchronous torque, the water turbine is rotated inversely so that the constant delay angle changes to a constant lead angle as it is. Therefore, the three-phase modulation motor or modified modulation motor acts as a modulation generator or modified modulation generator. The generated power is directly supplied to the AC power source with no relation to the rotation speed because of the constant lead angle. The three-phase generated power can be controlled by the three-phase thyristors in a wide range. Also, an automatic constant speed control unit is not necessary for the water turbine. Therefore, the structure can be simplified.

(g) pollution free power generating plant

Various types of energy such as tidal energy, windy energy, sun shine energy, and exhausted heat energy and exhausted pressure energy from a power generating plant and factory are large in the total amount of energy but there is fluctuation of energy density. Therefore, the energy is not fully utilized at present. A conventional synchronous generator in a pollution free power generating plant maintains the synchronous speed and supplies the generated power to the AC power source. However, If the pollution free energy density for a prime mover becomes low, the synchronous speed cannot be maintained so that the energy is withdrawn and not utilized. Also, in a case that the prime mover is stopped, the synchronous generator makes the AC power source open so that the total amount of generated power is decreased. Therefore, the efficiency of generation is decreased and it is made difficult to develop the pollution free power generating plants.

If the single- or three-phase modulation generator or modified modulation generator of FIGS. 10A–10E having the constant torque characteristic is employed, all the drawbacks in the synchronous generator can be eliminated. If the torque of the prime mover is remarkably decreased relatively more than the synchronous torque or synthesized synchronous torque, the prime mover is stopped. Therefore, it is necessary to always control the synchronous torque or synthesized synchronous torque automatically by thyristors so as to equilibrate to the varying torque of the prime mover for preventing the prime mover from being stopped. If the prime mover loses the torque, the thyristors automatically closes the load current. Accordingly, it is not necessary to open the AC power source, so that the electric circuit and its maintenance can be simplified. The varying generated power dependent upon the lead angle is all supplied to the AC power source automatically. As long as the prime mover has any output, the total amount of generating power can be increased with no relation to the variation of the rotation speed, resulting in increasing the efficiency of generation. For instance, a private pollution free generator can automatically supply the power excess of the privately consumed power to the AC power source, and the power selling facility for power generating plant is economically simplified.

Figure 13:
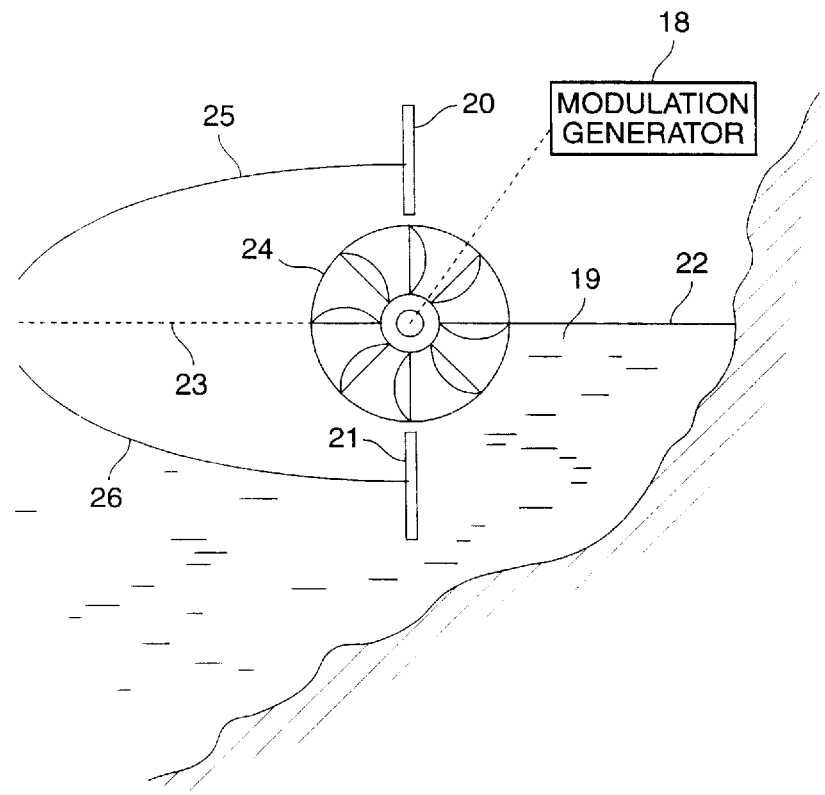
FIG. 13 is a diagram showing an operation principle when the modulation control type of modulation generator is applied to a tidal power generating plant with a water turbine.

An example of tidal power generating plant which has a new structure for increasing the generation efficiency is shown in FIG. 13. For simplification of figure the modulation generator or modified modulation generator is represented by a simple block 18 in the figure but a tank and a water wheel acting as the prime mover is included.

Referring to FIG. 13, a tank 19 which is partitioned by side walls for shielding wave and floats on the sea has at the bottom portion a channel communicated with the bottom of sea. Also, upper and lower wave preventing plates 20 and 21 are provided in one of the side walls in which the channel is provided. The seashore may be used as a portion of the side walls. Thus, the tank 19 has a still water plane 22 which is coincident with an average level 23 of the sea. The tank is provided to have the basic structure and principle such that a fisher works while watching a still water plane at wave preventing blocks. A water wheel 24 is provided at a small gap between the wave preventing plates 20 and 21 and the axis of the water wheel is arranged to be coincident with the still water plane 22 of the tank 19. The water wheel 24 can move upward and downward in accordance with high and low tide.

If the sea surface rises due to wave 25, the upper wave preventing plate 20 acts to prevent the wave and an upper portion of the water wheel 24 is pushed by the kinetic energy of the wave to be rotated in a direction because of the pressure difference between the pressure of the wave and the atmospheric pressure on the tank 19 side. The water on the water wheel makes the water wheel 24 rotate in the same direction by the weight of the water and backs to the sea while rotating the lower portion of the water wheel 24 in the same direction after the water falls to the surface 22 of the tank 19. A part of the water in the tank goes back to the sea through the channel provided at the bottom. As a result, the still water level 22 does not change. If the sea surface downs due to wave 26, the upper portion of the water wheel 24 is in the atmosphere and the atmospheric pressure acts to the lower portion of the water wheel 24 depending upon lower preventing plate 21. Thus, the water wheel 24 is rotated in the same direction because of the difference between the pressure on the tank 19 side and the atmospheric pressure on the other side. In this manner, all the energy which the sea water has is directly converted into the mechanical energy for the water wheel 24 so that the torque is increased totally, resulting in increasing the efficiency of the water wheel. Therefore, the modulation generator or modified modulation generator having the constant torque characteristics keeps the lead angle constant and is rotated by the water wheel and automatically supplies the generated power to the AC power source with no relation to the variation of rotation speed.

In this manner, the total amount of generated power is increased to increase the generation efficiency, and since the tidal power generating plant has the simplified structure as shown in FIG. 13, the tidal power generating plant can be readily developed.

Note that the water wheel 24 shown in FIG. 13 is rotated and a block 18 corresponds to the structures shown in FIGS. 10A–10E. Accordingly, the reference numeral 13 in FIGS. 10A–10E or 11 is the prime mover and the modulation generator or modified modulation generator supplies the generated power to the power source.

Seashore is long in Japan and RIA shoreline is adapt for the tidal power generating plant. In the ria shoreline, since the width and depth rapidly reduce, the wavelength is decreased and the height of wave is increased due to the kinetic energy. For instance, the wavelength of sea wave is made to be zero by a breakwater, the height of the sea wave is increased. Further, if the tank is moved from place to place as necessary, the total amount of generated power can be further increased. In order to prevent the water wheel from being damaged by storm, it is necessary to take measurements such that the water wheel is temporarily sunk in the sea deeply.

If a plurality of pollution free power generating plants are operated in parallel, the variation of synthesized generated power can be reduced because variation of the total amount of generated power because of the variation of the respective generated powers are cancelled each other and there is no cause of hunting. The generation efficiency can be increased by the synthesized generated power with no relation to the speed variation of each prime mover relatively. The conversion efficiency of solar battery is about 10% which is extremely low compared to the efficiency of tidal power generating plant shown in FIG. 13. A DC-AC converter increases economical cost. A thermal power generating plant increases pollution gas and carbon oxide gas and the atomic power generating plant requires a large amount of power for refining uranium so that pollution gas and carbon oxide gas are indirectly increased.

(h) vibration preventing structure of multistory building

If there is no inertia in a building, the ground and the building on the ground are unitarily vibrated by earthquake. Accordingly, external force acting to the building is small and the possibility of destruction of the building is also small. In actual, since the building has heavy weight and large inertia, the building is temporarily in a whipped state. Since a lower portion of the building is firmly fixed to the ground, the lower portion is vibrated with earthquake. However, the upper portion of the building is not moved due to the inertia, the building is deformed. For instance, if the ground and the lower portion of the building are moved in a direction, deformation force is generated at the lower portion and the reacting force against the deformation force acts to the upper portion of the building. Since both the forces act with respect to different supporting points, the forces functions as destruction torque. The building is wrung and destructed in a buckling manner. The more the rigidity of the building is increased, the more the deformation force necessary to deform it slightly is increased.

In order to remove the above drawbacks, in a conventional vibration preventing apparatus, buffer material is inserted between the ground and the lower portion of the building such that they are separated. The buffer material is typically formed of a laminate structure of iron plates and rubber plates. The buffer material absorbs earthquake energy in a vertical direction and supports the weight of the building by the rigidity. However, elastic deformation reduces the deformation force to the building and acts as recovery force.

Figure 14:
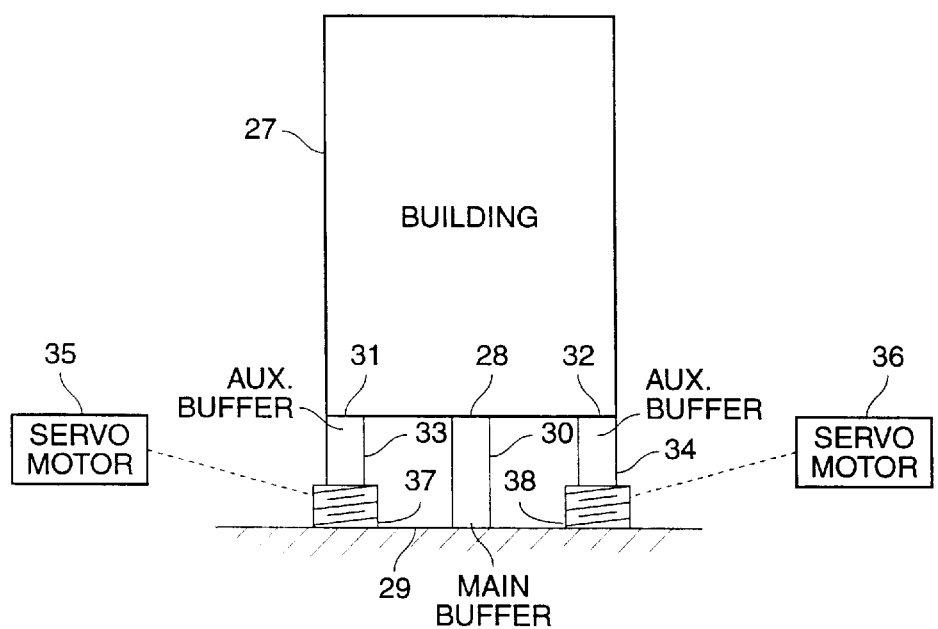
FIG. 14 is a diagram showing the structure of a building when the modulation motor is applied to a vibration-free apparatus.

FIG. 14 is a schematic cross sectional view of an improved vibration preventing apparatus. A main buffer material 30 is inserted between the gravity 28 of the lower portion of a building 27 and the ground 29 to support the weight of the building 27. A pair of auxiliary buffer materials 33 and 34 are provided at both ends of the lower surface of the building 27 to equally support the weight of the building 27. The modulation motors 35 and 36 acting as servo motors and having the structure shown in FIG. 9 and spiral screws 37 and 38 movable up and down are provided between the auxiliary buffer materials 33 and 34 and the ground 29. The servo motors rotates the spiral screws 37 and 38 differentially and used to incline the building 27 with respect to the position 28 as the supporting point. However, since the position 28 does not change the position in the vertical direction, it is necessary to satisfy the condition that the synchronous rotation between the servo motors 35 and 36 is maintained. For instance, if the position 31 is down, the servo motor 35 provides generation function because the drop energy of the building 27 due to the weight acts as a prime mover. The generated power is used for driving force of the servo motor 36 required to arise the position 32. Accordingly, the power for the servo motor 35 and the power for the servo motor 36 are cancelled on the calculation. As a result, no supply power is required as the common exciting power source for the servo motors. However, since the weight of the building 27 is extremely heavy so that loss due to friction is increased in the spiral screws 37 and 38, the power for the loss and a part of power for inclination are required for the common exciting power source.

The destruction torque can be cancelled by the inclination torque so that the destruction of the building in a buckling manner can be prevented. Since a position of the gravity moves in the inclination torque, the weight of the building acts as a pendulum. The pendulum torque has an equilibrating function to back the position 28 to the moved position of the ground 29. As described above, the destruction torque is cancelled by the inclination toque and as a result of this the synthesized torque is remarkably reduced. Therefore, when earthquake occurs, the inclination of the building 27 and the deformation force are small. In actual, there is the effect to sufficiently reduce the amount of rotation of the servo motors 35 and 36 and the amount of movement of the spiral screws 37 and 38. The servo motors 35 and 36 operate in an inevitable direction in synchronous with the repeating vibration due to earthquake. In order to maintain the synchronization, it is necessary to sufficiently increase start torque.

The synchronous torque with no relation to the rotation speed of the modulation motor corresponds to start torque of an induction motor in the stationary state. Therefore, the magnitude of the synchronous torque is extremely large. Since the start torque generated based on the same principle can be controlled in a wide range by controlling the load, the magnitude of start torque can be readily increased. However, in the induction motor, if the rotation speed is increased, the torque is decreased. On the other hand, in the modulation motor such a drawback is not present. Therefore, the modulation motors shown in FIG. 9 are necessary to be used as the servo motors 35 and 36. The induction motor is superior in the start torque but since the slip changes depending upon the output, it is one cause of hunting in the control of servo motors. On the other hand, in the modulation motor, there is no slip and there is almost not the armature reaction, the synchronous reactance can be removed. In the synchronous motor the start torque is small and the armature reaction is present.

Generally, the vibration direction of earthquake is not constant but changes. Therefore, it is desirable in actual that three sets of auxiliary buffer materials 33 and 34 which are provided at the spatial angle of 120° between three sets with respect to the position 28 of the building 27 as a center point. This is because a differential movement is provided between the spiral screws 37 and 38, the three sets of inclining values are synthesized and the direction of the synthesized inclination is made coincident with the direction of the earthquake. For instance, a deviation between the center position 28 and the ground 29 is measure for all the sets of spiral screws 33 and 34. The servo motors 35 and 36 of each sets are controlled by an automatic control unit to eliminate these measured deviations. When the earthquake decays to stop the vibration of the ground, the pendulum torque and the recovery force of the buffer material eliminated the deviations. At the time, the building has no inclination and the servo motors are not rotated.

Figure 15A:
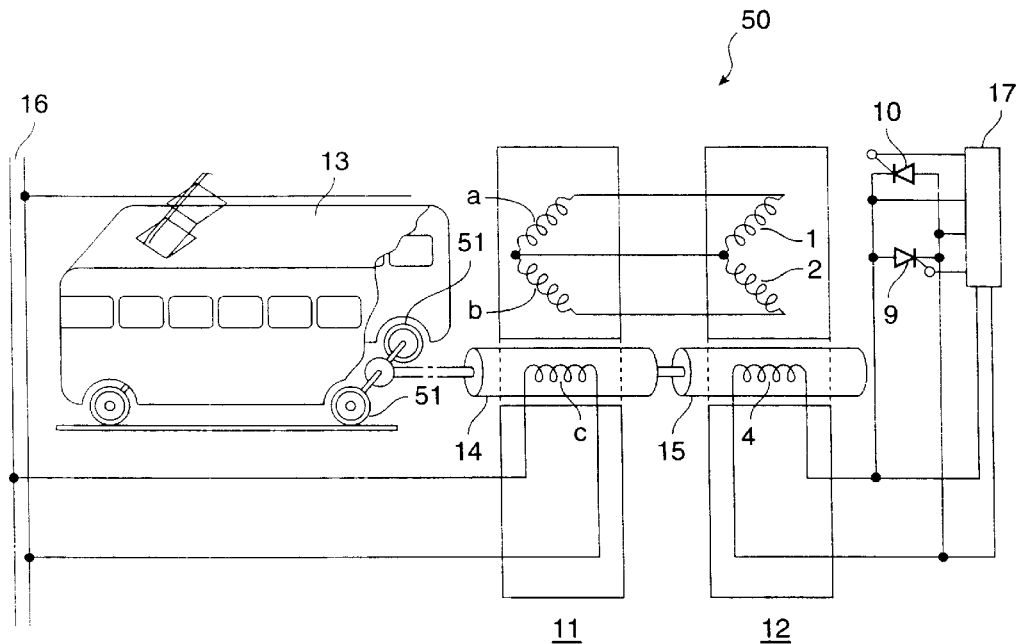
FIG. 15A illustrates an example electric train car according to the present invention.

FIG. 15A illustrates an example electric train car 50 according to the present invention. In FIG. 15A, an AC power supply 16 excites a winding c of a modulator 11. The induced voltages excite windings 1 and 2 of a modulation motor 12. Accordingly, voltages are generated in a winding 4 of a rotor 15 of the modulation motor 12. The rotor 15 rotates the axis 14 using synchronous torque. The axis 14 in turn rotates wheels 51 of the electric train car 50. The rotating wheels move the electric train car, thereby constituting a mechanical load 13. Pairs of thyristors 9 and 10 are connected to the winding 4 as an electrical load. A control circuit 17 controls the thyristors to change the load current and thereby change synchronous torque. The modulator 11 and the modulation motor 12 are as shown in FIGS. 10A–10E.

Figure 15B:
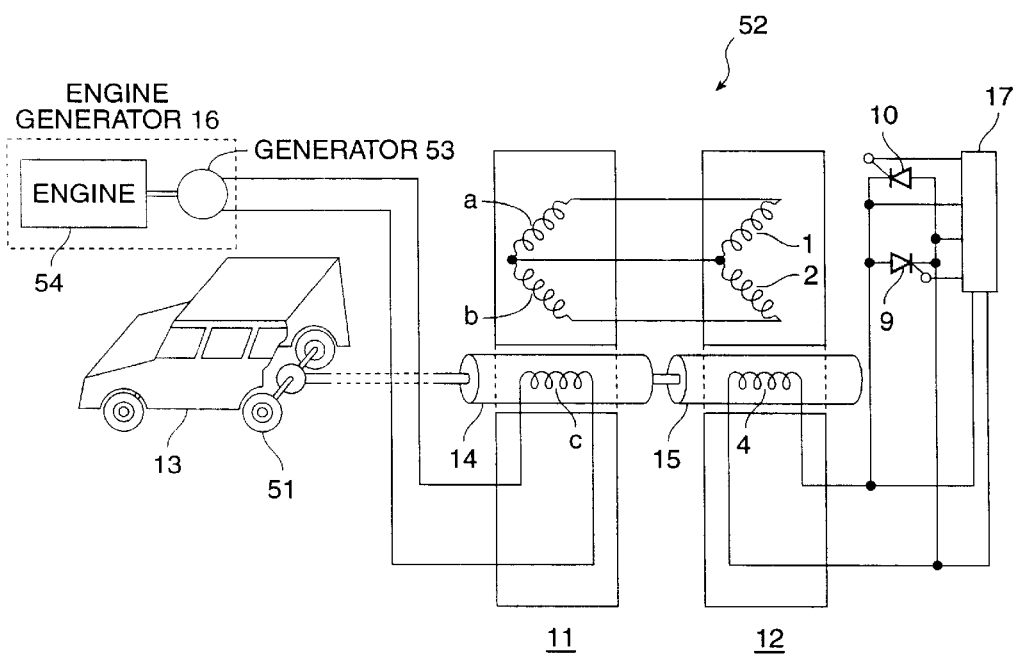
FIG. 15B is an example electric automobile according to the present invention.

FIG. 15B illustrates an example electric automobile 52 according to the present invention. In FIG. 15B, the output of an alternate generator 53 directly coupled to an engine 54 corresponds to the AC power source 16 of FIGS. 10A–10E. In FIG. 15B, an axis 14 rotates wheels 51 of the electric automobile 52. The rotating wheels move the electric train car, thereby constituting a mechanical load 13. The remainder of FIG. 15B corresponds to like-numbered portions of FIG. 15A, described above.

Figure 15C:
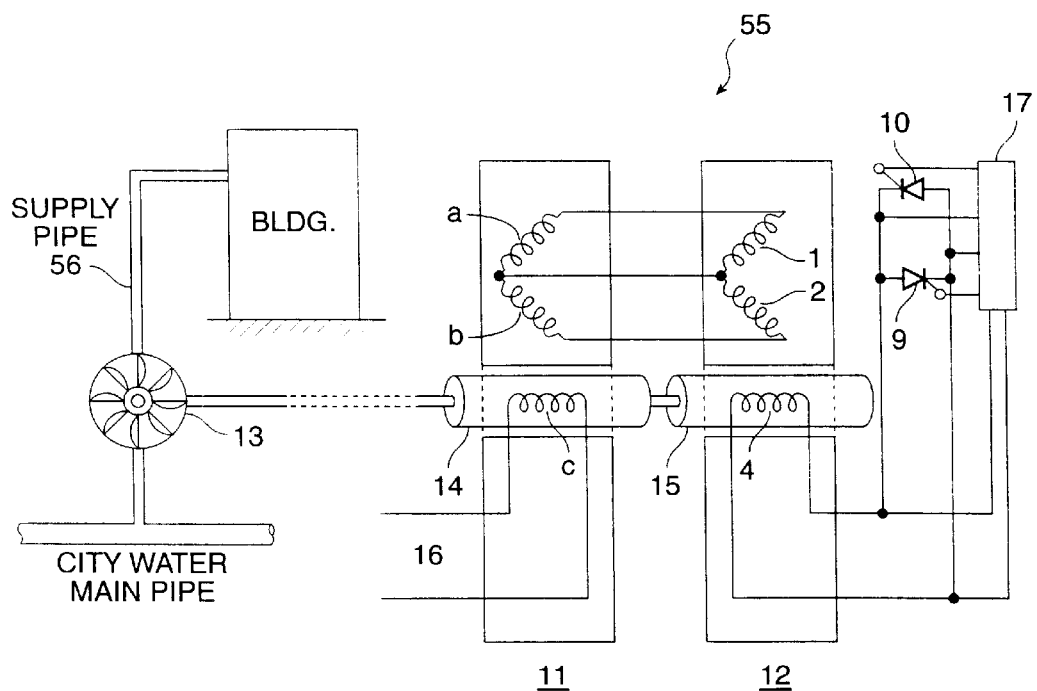
FIG. 15C is an example fluid control apparatus according to an aspect of the present invention.

FIG. 15C illustrates an example fluid control apparatus 55 according to the present invention. In FIG. 15C, a modulation motor 11 plus 12 having the constant torque characteristic of FIGS. 10A–10E rotates a water supply pump 13 which is coupled to a water pipe 56. A constant pressure is generated by constant synchronous torque of the modulation motor 12 so that changes in water supply pressure can be automatically compensated. The remainder of FIG. 15C corresponds to like-numbered portions of FIG. 15A, described above.

Figure 15D:
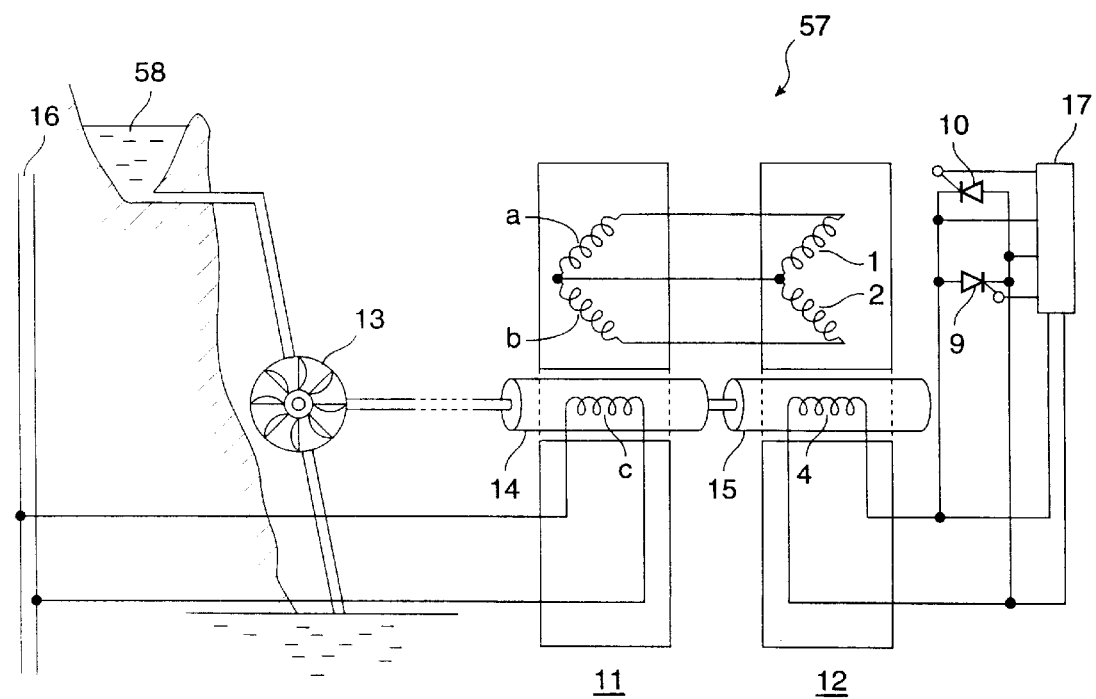
FIG. 15D is an example pumped storage type power generating plant according to an aspect of the present invention.

FIG. 15D illustrates an example pumped storage type power generating plant 57 according to the present invention. In FIG. 15D, falling water from a reservoir 58 rotates a turbine 13 which functions as a prime mover. As a result, a modulation generator 12 generates power to a power receptacle 16. The modulation generator 12 can also be operated as a modulation motor to pump water up to the reservoir 58. In FIG. 15D, the pump can be controlled by the control apparatus 17 in a wide range without being influenced by the speed of rotation. The remainder of FIG. 15D corresponds to like-numbered portions of FIGS. 10A–10E, described above.

Figure 15E:
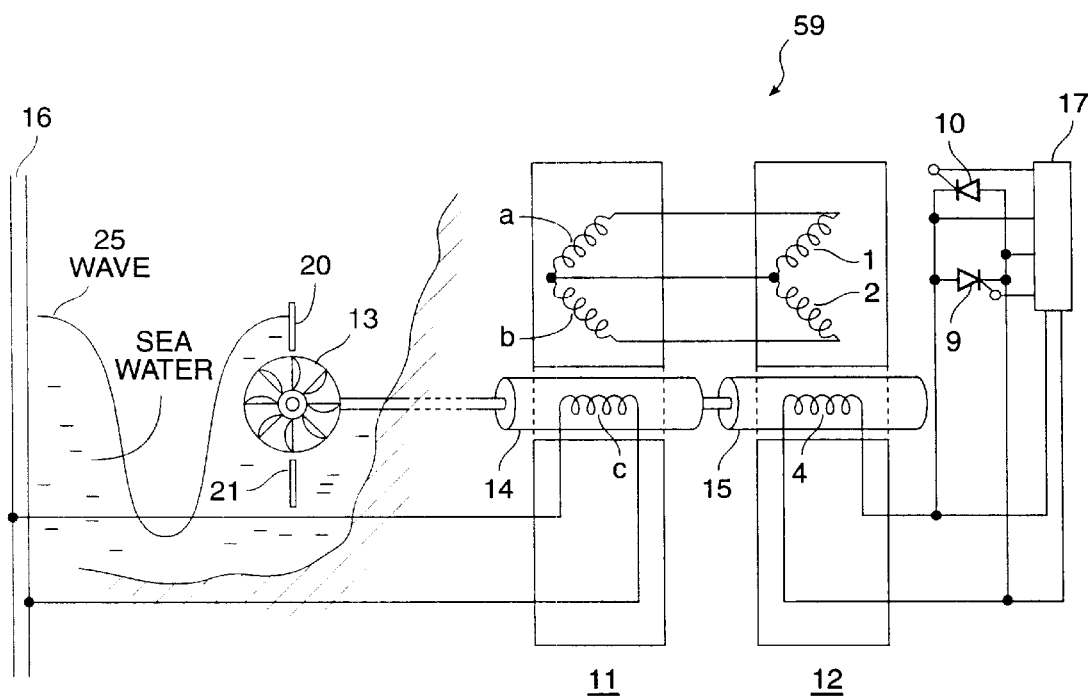
FIG. 15E is an example tidal power generating system according to an aspect of the present invention.

FIG. 15E illustrates an example tidal power generating system 59 according to the present invention. In FIG. 15E, a water wheel 13 acts as a prime mover and a modulation generator 12 automatically supplies generated power to a power receptacle 16. As discussed above in the specification, the rotation of the water wheel 13 is not stopped even when the non-polluting energy is at a very low level because a control circuit 17 controls the thyristors to control the synchronous torque so as to equilibrate to the varying torque of the prime mover. The remainder of FIG. 15E corresponds to like-numbered portions of FIGS. 13 and 15D, described above.

Figure 15F:
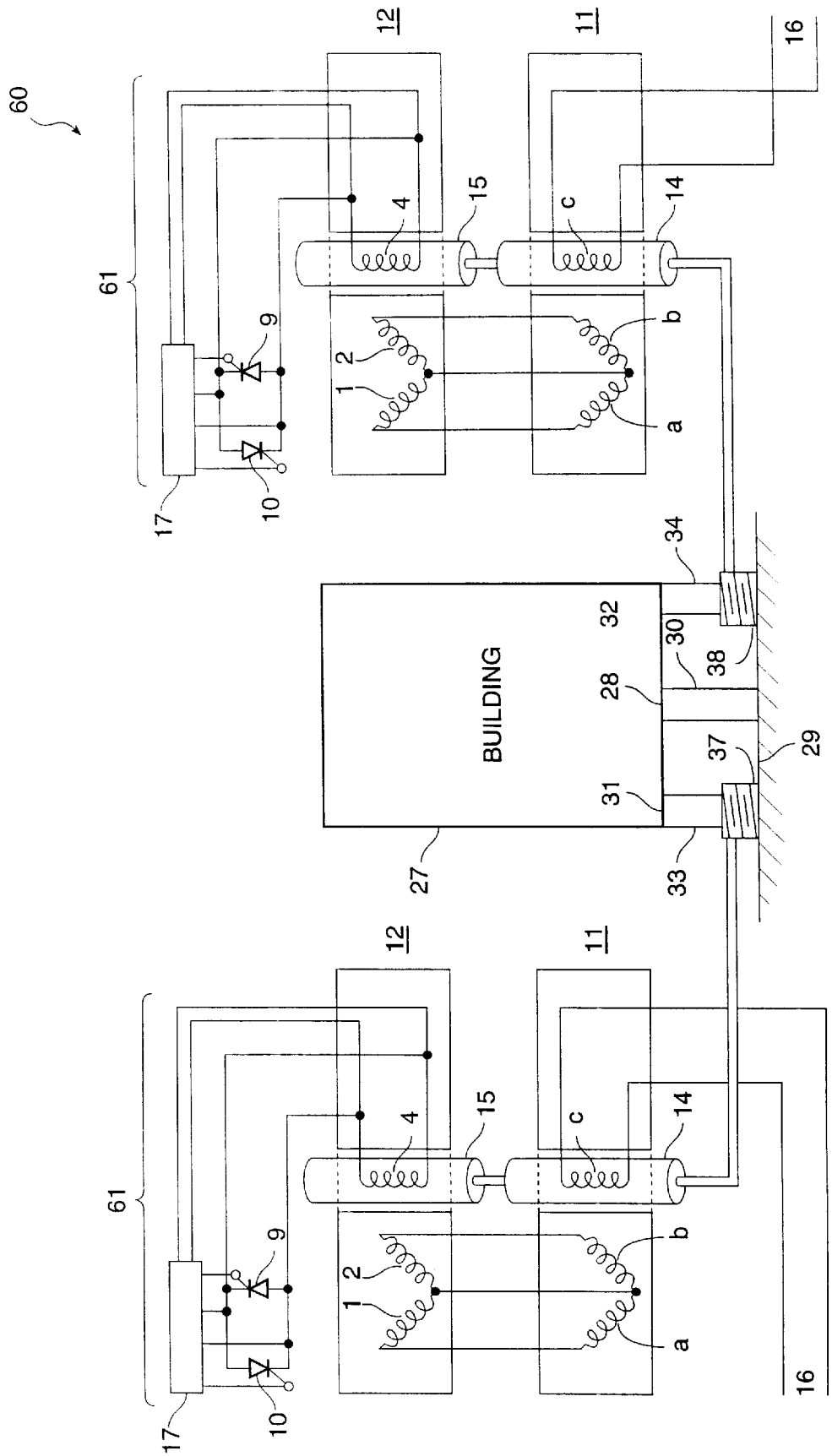
FIG. 15F is an example vibration reducing apparatus according to an aspect of the present invention.

FIG. 15F illustrates an example vibration reducing apparatus according to the present invention. In FIG. 15F, auxiliary buffer members 33 and 34 and spiral screws 37 and 38 are provided between the ground 29 and a building 27 which has large inertia. The screws 37 and 38 are rotated by a rotor 14, also shown in FIGS. 10A–10E, to prevent destruction of the building 27 by slightly inclining the building. Therefore, each modulation AC machine 61 acts alternatively as a motor and a generator. Power is supplied from a common line 16. Because the inertia of the building is very large, the modulation AC machines 61 are particularly suitable because their torques do not change based on speed of rotation. The remainder of FIG. 15E corresponds to like-numbered portions of FIGS. 14 and 10, described above.

What is claimed is:
1. An electric automobile comprising:
a rotary shaft;
an AC generator as an AC power source, including an engine driven with a predetermined rotation speed to generate constant AC voltage;
a mechanical modulator including a modulator rotor, a modulator stator winding, and a modulator rotor winding connected to said AC power source and provided on said modulator rotor, for receiving said AC voltage from said AC power source by said modulator rotor winding, and for generating a multiphase amplitude-modulated voltage from said received AC voltage in said modulator stator winding, said amplitude-modulated voltage having a frequency proportional to the number of rotations of said modulator rotor winding; and
a modulation motor including a motor rotor, a motor stator winding connected to said modulator stator winding, and a motor rotor winding connected to a pair of thyristors thereby constituting an electric load, wherein said motor stator winding generates an alternate rotary magnetic field of an alternate main magnetic flux in response to said multiphase amplitude-modulated voltage from said modulator stator winding, and said motor rotor winding is rotated in response to said alternate rotary magnetic field,
wherein said rotary shaft is connected to said modulator rotor which is connected to said motor rotor, and
wherein the modulation frequency is controlled by using synchronous torque generated by said modulation motor.

2. A pumped storage type power generating plant, including:
a water turbine;
a mechanical modulator including a modulator rotor, a modulator stator winding, and a modulator rotor winding connect to an AC Power line and provided on said modulator rotor; and
a modulation AC machine including an AC machine rotor connected to said modulator rotor, an AC machine stator winding connected to said modulator stator winding, and an AC machine rotor winding connected to an electric load,
wherein when said modulator rotor winding receives AC voltage through said AC power line, said modulator stator winding generates a multiphase amplitude-modulated voltage,
wherein said AC machine stator winding generates an alternate rotary magnetic field of an alternate main magnetic flux in response to said multiphase amplitude-modulated voltage from said modulator stator winding, and said AC machine rotor winding is rotated in response to said alternate rotary magnetic field so that said water turbine is rotated to pump up water, and
wherein when said water turbine is rotated by falling water, said AC machine rotor and said modulator rotor are rotated so that AC poser is generated and the generated AC power is supplied onto said AC power line.

3. A tidal power generating system including:
a tank having an opening portion such that water in said tank is connected to sea and wave is prevented so as to have a still water plane;
a water wheel having a rotary shaft and provided at an end portion of said tank on a sea side such that a center axis of said water wheel is provided in alignment with the still water plane;
wave preventing plates provided at upper and lower portions of said water wheel;
a mechanical modulator including a modulator rotor connected to said rotary shaft of said water wheel, a modulator stator winding, and a modulator rotor winding connected to an AC power line and provided on said modulator rotor; and a modulation AC machine including an AC machine rotor connected to said modulator rotor, an AC machine stator winding connected to said modulator stator winding, and an AC machine rotor winding connected to an electric load, and wherein when said water wheel is rotated by waves, said AC machine rotor and said modulator rotor are rotated so that AC power is generated and the generated AC power is supplied onto said AC power line.

4. A vibration reducing apparatus comprising:

three pairs of spiral screws provided between a building and ground, which vibrates by earthquake, via auxiliary buffer members to have a spatial angle of about 120° between every two pairs so that the building can be uniformly supported;

three sets of modulation motors connected to an AC power source via plural modulators, in which modulation frequency is controlled by external force, the rotation speed being controlled by the external force and said set of modulation motors moving up and down each of said pairs of spiral screws;

a main buffer material provided at a central position of the bottom surface of the building between the building and the ground; and control means for controlling said three sets of modulation motors such that a synthesized inclination direction is coincident with the vibration direction of ground, wherein the spiral screws of each pair are differentially moved up and down such that inclinations of the building in three directions by said three pairs of spiral screws are synthesized, each of said modulators having a modulator rotor, a modulator stator winding, and a modulator rotor winding connected to an AC power line and provided on said modulator rotor, said modulator rotor coupled to one of said spiral screws, each of said modulation motors having an motor rotor connected to said modulator rotor, a motor stator winding connected to said modulator stator winding, and motor rotor winding connected to an electric load, wherein said modulators each is either a single-phase or a three-phase type of modulator, wherein said modulators each is further either a mechanical modulator or a modulation amplifier, wherein said modulation motors each is either a single-phase or a three-phase type of motor, wherein destructive force to the building by earthquake is made to be canceled by the synthesized inclination.

5. A modulation AC machine comprising:

a plurality of mechanical modulators, each of said plurality of mechanical modulators having a modulator stator winding and a modulator rotor winding connected to a three phase AC power source, receiving an AC voltage as a carrier wave voltage from said AC power source by said modulator rotor winding, and generating a multiphase amplitude-modulated voltage from said carrier wave voltage in said modulator stator winding by rotating said modulator rotor winding by external force, said amplitude-modulated voltage having a frequency proportional to the number of rotations of one of said plurality of modulator rotor windings, said modulator stator winding and said modulator rotor winding are provided with an angle difference of $2\pi/3$ in an axis direction of a modulator rotor; and a modulation AC machine having a plurality of AC machine stator windings and a plurality of AC machine rotor windings, one of said plurality of AC machine stator windings being connected to a corresponding one of said modulator stator windings and having a corresponding AC machine rotor winding connected to an electric load, wherein said plurality of AC machine stator windings generate an alternate rotary magnetic field of an alternate main magnetic flux in response to said multiphase amplitude-modulated voltage from said modulator stator winding, and said AC machine rotor winding is rotated in response to said alternate rotary magnetic field.

6. A modulation AC machine comprising:

a plurality of mechanical modulators, each of said plurality of mechanical modulators having a modulator stator winding and a modulator rotor winding connected to a three phase AC power source, receiving an AC voltage as a carrier wave voltage from said AC power source by said modulator rotor winding, and generating a multiphase amplitude-modulated voltage from said carrier wave voltage in said modulator stator winding by rotating said modulator rotor winding by external force, said amplitude-modulated voltage having a frequency proportional to the number of rotations of said modulator rotor winding, said modulator stator winding and said modulator rotor winding are provided to a modulator stator and a modulator rotor depart from each other by $2\pi/3$, respectively; and a modulation AC machine having a plurality of AC machine stator windings and a plurality of AC machine rotor windings, one of said plurality of AC machine stator windings being connected to a corresponding one of said modulator stator winding and having a corresponding AC machine rotor winding connected to an electric load, one of said plurality of AC machine stator windings and one of said plurality of AC machine rotor windings are provided to an AC machine stator and an AC machine rotor depart from each other by $2\pi/3$, respectively, wherein said plurality of AC machine stator windings generate an alternate rotary magnetic field of an alternate main magnetic flux in response to said multiphase amplitude-modulated voltage from said modulator stator winding, and said AC machine rotor winding is rotated in response to said alternate rotary magnetic field.

7. A modulation AC machine comprising:

a modulator having an electric circuitry modulation amplifier connected to a three phase AC power source for generating a modulation wave voltage and for executing amplitude modulation to carrier wave voltage supplied from said AC power source in accordance with said modulation wave voltage to generate a multiphase amplitude-modulated voltage; and a modulation AC machine having a plurality of AC machine stator windings and a plurality of AC machine rotor windings connected to said modulator and AC machine rotor winding connected to an electric load, one of said plurality of AC machine stator windings and one of said plurality of AC machine rotor windings are provided with an angle difference of $2\pi/3$ in an axis direction of said AC machine rotor, said multiphase amplitude-modulated voltage is supplied to a corresponding one of said plurality of AC machine stator windings, wherein each of said plurality of AC machine stator windings generates an alternate rotary magnetic field of an alternate main magnetic flux in response to said multiphase amplitude-modulated voltage from said modulator, and said AC machine rotor winding is rotated in response to said alternate rotary magnetic field.

8. A modulation AC machine comprising:

a modulator having an electric circuitry modulation amplifier connected to a three phase AC power source, for generating a modulation wave voltage and for executing amplitude modulation to carrier wave voltage supplied from said AC power source in accordance with said modulation wave voltage to generate a plurality of multiphase amplitude-modulated voltages which are supplied to a corresponding one of said plurality of AC machine stator windings; and a modulation AC machine having a plurality of AC machine stator windings and a plurality of AC stator windings connected to said modulator and AC machine rotor winding connected to an electric load and having an angle difference of $2\pi/3$ in one of said plurality of AC machine stator windings and one of said plurality of AC machine rotor windings, wherein said AC machine stator winding generates an alternate rotary magnetic field of an alternate main magnetic flux in response to said multiphase amplitude-modulated voltage from said modulator, and said AC machine rotor winding is rotated in response to said alternate rotary magnetic field.

* * * * *